(12) United States Patent
Kinnunen et al.

(10) Patent No.: US 8,503,569 B2
(45) Date of Patent: Aug. 6, 2013

(54) METHOD AND APPARATUS TO LINK MODULATING AND CODING SCHEME TO AMOUNT OF RESOURCES

(75) Inventors: Pasi Kinnunen, Oulu (FI); Kari Pajukoski, Oulu (FI); Esa Tiirola, Kempele (FI)

(73) Assignee: Nokia Siemens Networks, Espoo (FI)

( * ) Notice: Subject to any disclaimer, the term of this patent is extended or adjusted under 35 U.S.C. 154(b) by 668 days.

(21) Appl. No.: 12/387,230

(22) Filed: Apr. 28, 2009

(65) Prior Publication Data

US 2009/0268844 A1 Oct. 29, 2009

Related U.S. Application Data

(60) Provisional application No. 61/048,908, filed on Apr. 29, 2008, provisional application No. 61/048,554, filed on Apr. 29, 2008, provisional application No. 61/125,961, filed on Apr. 28, 2008.

(51) Int. Cl.
*H04L 27/00* (2006.01)

(52) U.S. Cl.
USPC ............ 375/295; 455/39; 455/73; 455/91; 455/434; 455/450; 455/464

(58) Field of Classification Search
USPC ............ 375/295; 455/39, 73, 91, 434, 450, 455/464
See application file for complete search history.

(56) References Cited

U.S. PATENT DOCUMENTS

2008/0153425 A1* 6/2008 Heo et al. .................. 455/68

FOREIGN PATENT DOCUMENTS

EP 2031888 A1 3/2009
WO WO 2007/148583 12/2007

OTHER PUBLICATIONS

NTT DoCoMo et al.; "Implicit Resource Allocation of ACK/NACK Signal in E-UTRA Uplink"; 3GPP TSG RAN WG1 Meeting #48bis, R1-071650; pp. 1-3; Mar. 2007; St. Julians, Malta.
Nokia; "Uplink Scheduling for VoIP"; 3GPP TSG=RAN WG2 Meeting #57, R2-070476; pp. 1-15; Feb. 2007; St. Louis, Missouri, USA.
Patent Cooperation Treaty; C. Masche; "International Search Report"; pp. 1-5; Sep. 29, 2009.
Patent Cooperation Treaty; H. Pettersson; "International Search Report and Written Opinion"; pp. whole document; Nov. 9, 2009.
3GPP TSG RAN WG1 Meeing #52bis, R1-081165; "Draft Agenda"; whole document; Mar. 31-Apr. 4, 2008.
3GPP TSG RAN1 #52-bis, R1-081295; "Resource Provision for UL Control in PUSCH"; whole document; Mar. 31-Apr. 4, 2008.
3GPP TSG-RAN WG1 #50, R1-073842; "Notes from uplink control signaling discussions"; whole document; Aug. 20-24, 2007.
3GPP ETSI TS 136 300, V8.0.0; "Universal Mobile Telecommunications System (UMTS); Evolved Universal Terrestrial Radio Access (E-UTRA) and Evolved Universal Terrestrial Radio Access (E-UTRAN); Overall description; Stage 2"; whole document; Mar. 2007.
Nokia Siemens Networks, Nokia: R1-081457, 3GPP TSG RAN WG1 Meeting #52bis,Linkage between PUSCH MCS and amount of resources for ACK/NACK on PUSCH, Shenzhen, China, Mar. 31-Apr. 4, 2008; whole document.

* cited by examiner

*Primary Examiner* — Leila Malek
(74) *Attorney, Agent, or Firm* — Ware, Fressola, Maguire & Barber

(57) ABSTRACT

A plurality of substantially static input parameters are provided, and a plurality of signalled input parameters are also provided. From the substantially static input parameters and the plurality of signaled input parameters, an output parameter is determined that is indicative of a number of control symbols per transmission time interval for an amount of control signaling bits. The output parameter relates to a modulation and coding scheme for an uplink.

24 Claims, 38 Drawing Sheets

PRIOR ART

PRIOR ART

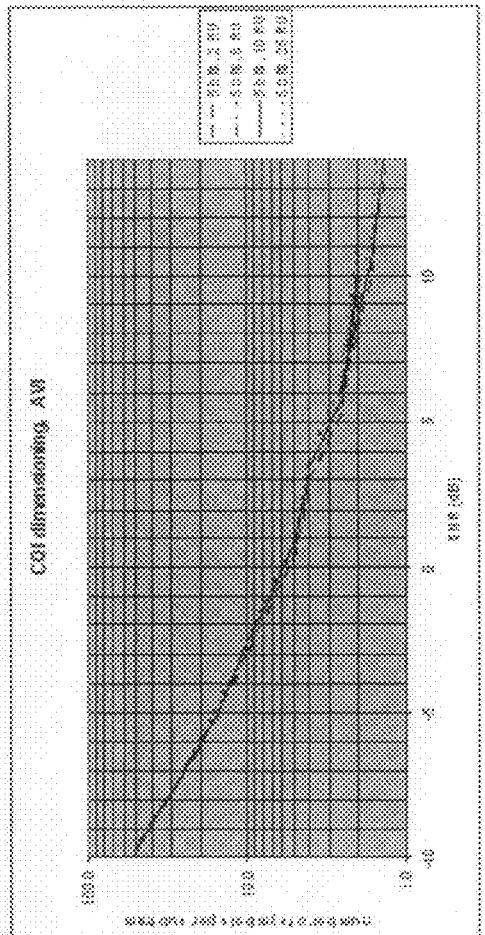
FIG. 8

Shenzhen decisions

- Control signaling on PUSCH
  - Modulation scheme
    - CQI/PMI on PUSCH uses the same modulation scheme as data on PUSCH
  - Code rate for control
    - Continue discussion until next meeting.
  - Offset
    - Semi-statically configured offset between the data MCS and the code rate of the control signaling (A/N and CQI)
    - Next steps: Define the offset values. Discuss whether multiple offsets are needed e.g. when multiple services with different QoS are time multiplexed

- Open issues
  - Linkage between PUSCH MCS and amount of resources for control on PUSCH (i.e., offset values)
    - UE procedure
    - NB procedure
    - Signalling support

*FIG. 10*

Proposed scheme

- $N$: Number of control signaling bits (for given control type)
- $M_{ctrl}$: Number of control symbols for a certain control type
- $BPRE$: bits/resource element (symbol) for given data MCS
  - $BPRE = CR / M_{mod}$, $M_{mod} \in \{2, 4, 6\}$, $CR \in \{\ldots, 4, 3, 2, 3/2, 4/3, \ldots\}$
- $\mathit{offset\_dB}$: quality difference between given control type and PUSCH data, configured via RRC
  - = S(I)NR requirement for control − S(I)NR requirement for data
  - Configured/signaled via RRC
  - Common for all data MCS?

- $\lceil \ \rceil$: ceil operation $M_{ctrl} = \left\lceil \dfrac{N \cdot BPRE}{10^{\frac{-\mathit{offset\_dB}}{10}}} \right\rceil$

Signalling

- ACK/NACK
  - Dynamic range: X dB?
  - DTX-to-ACK issue needs to be solved (these results assume explicit DTX signalling bit included in UL grant)
  - RRC signalling can be used

- Other control formats (CQI)
  - Dynamic range: Y dB
  - CQI size –specific (to some extentd)
  - Signalled via RRC signalling

- Persistent A/N
  - Separate Offset_dB parameter

*FIG. 19*

Observations

- In some cases, more than 1 different value (e.g.,) Offset_dB values can be considered
  - One applicable for low MCSs
  - Another applicable for high MCSs

- The same applies for different BW allocations for PUSCH
  - Offset_dB_1 for BW < $K$ RBs
  - Offset_dB_2 for BW = $K$ RBs

- If multiple services having different BLER operation point are applied simultaneously different (fixed) offsed value can be applied

*FIG. 20*

Improved DTX detection

* The preferred use case for improved DTX detection is the situation in which the UL grant is not present (-> 1 bit included in UL grant cannot be used)
* In these cases, it is possible to always reserve $M_{ctrl}$ symbols and transmit NACK or DTX using this symbol space. Problem is the excessive control overhead.
* The idea of improved DTX detection is to define the control signaling size in such that a certain number of ACK/NACK symbols are always reserved. The idea can be presented as follows:

$$M_{ctrl} = \max\left(\left\lceil \frac{N \cdot BPRE}{10^{\frac{-offset\_dB}{10}}} \right\rceil, K\right)$$

– where $K$ is a predetermined number, e.g., 8-10.
  – This number is selected in such that it will provide sufficient DTX detection performance while maintaining reasonable control overhead.
* When ACK/NACK is present, then the number of A/N symbols is calculated based the equation above.
* In the case when ACK/NACK is absent, then $K$ symbols are still reserved.
  – In these cases, UE can signal either NACK or DTX.
* Benefit of this arrangement is that control overhead is reduced and, at the same time DTX performance is always guaranteed.

FIG. 21

Simulation assumptions

- Both short-term (non-persistent scheduling) and long-term performance (persistent scheudling) are considered
  - Frequency hopping OFF
- Bandwidth allocation: [2, 6, 10, 25] RBs
- TU channel, v=3 km/h, 2 receiving antennas
- Channel coding
  - Block coding (32,N) with N=5, N=10
  - Tail-biting convolutional codes (1/3)
  - Simple matching has been used to support variable code rates for CQI
    - Convolutional codes:
      - repetition of every Nth bit
      - puncturing of parity bits only
    - Block codes:
      - Repetition/puncturing for every Nth bit

- Practical receiver assumptions, realistic channel estimation

*FIG. 22*

RAN1 Status

- Control signaling on PUSCH
  - Modulation scheme
    - CQI/PMI on PUSCH uses the same modulation scheme as data on PUSCH
  - Offset
    - Semi-statically configured offset between the data MCS and the code rate of the control signaling (A/N and CQI)
    - Next steps: Define the offset values. Discuss whether multiple offsets are needed e.g. when multiple services with different QoS are time multiplexed

- Open issues
  - Formula to determine the size of control region based on data MCS
  - Offset values

*FIG. 28*

Proposed formula to determine the size of control region based on data MCS $$M_{ctrl} = \left\lceil N \cdot \frac{CR}{\frac{M_{Mod}}{10^{\frac{-\text{offset\_dB}}{10}}}} \right\rceil$$

- $M_{ctrl}$: Number of control symbols for given control type
- $N$: Number of control signalling bits (for given control type)
- $CR$: coding rate of given PUSCH MCS, e.g., 3/1
- $M_{mod}$: number of (uncoded) bits/symbol $M_{mod} \in \{2, 4, 6\}$
- $\text{offset\_dB}$: quality difference between given control type and PUSCH data
  - S(I)NR requirement for control – S(I)NR requirement for data
  - Configured/signalled via RRC
- $\lceil \ \rceil$: cell operation
  - rounds the control channel size to the nearest supported integer value, towards (plus) infinity.

Conclusions

- We have presented a robust scheme to size the PUSCH control channel
  - Calculated control size reflects well the true control performance

- The proposed scheme is applicable for all situations
  - Both ACK/NACK and CQI
  - Both dynamically scheduled and persistently scheduled data

- We propose that the equation below is adopted as method to size the control channel on PUSCH

$$M_{cst} = \left\lceil N \cdot \frac{CR}{\frac{M_{Mod}}{10} \cdot \frac{\alpha_{fbr\_all}}{10}} \right\rceil$$

FIG. 38

METHOD AND APPARATUS TO LINK MODULATING AND CODING SCHEME TO AMOUNT OF RESOURCES

CROSS REFERENCE TO RELATED APPLICATIONS

The present application claims priority to U.S. Provisional Application 61/125,961 filed on Apr. 28, 2008. The present application also claims priority to U.S. Provisional Applications 61/048,554 and 61/048,908 both filed on Apr. 29, 2008.

FIELD OF THE INVENTION

The invention relates to the field of wireless telecommunications. More particularly, the present invention pertains to resource allocation in wireless telecommunications.

BACKGROUND OF THE INVENTION

The telecommunications industry is in the process of developing a new generation of flexible and affordable communications that includes high-speed access while also supporting broadband services. Many features of the third generation (3G) mobile telecommunications system have already been established, but many other features have yet to be perfected. The Third Generation Partnership Project (3GPP) has been pivotal in these developments.

One of the systems within the third generation of mobile communications is the Universal Mobile Telecommunications System (UMTS) which delivers voice, data, multimedia, and wideband information to stationary as well as mobile customers. UMTS is designed to accommodate increased system capacity and data capability. Efficient use of the electromagnetic spectrum is vital in UMTS. It is known that spectrum efficiency can be attained using frequency division duplex (FDD) or using time division duplex (TDD) schemes. Space division duplex (SDD) is a third duplex transmission method used for wireless telecommunications.

As can be seen in FIG. 1, the UMTS architecture consists of user equipment 102 (UE), the UMTS Terrestrial Radio Access Network 104 (UTRAN), and the Core Network 126 (CN). The air interface between the UTRAN and the UE is called Uu, and the interface between the UTRAN and the Core Network is called Iu.

High-Speed Downlink Packet Access (HSDPA) and High-Speed Uplink Packet Access (HSUPA) are further 3G mobile telephony protocols in the High-Speed Packet Access (HSPA) family. They provide a smooth evolutionary path for UMTS-based networks allowing for higher data transfer speeds.

Evolved UTRAN (EUTRAN) is a more recent project than HSPA, and is meant to take 3G even farther into the future. EUTRAN is designed to improve the UMTS mobile phone standard in order to cope with various anticipated requirements. EUTRAN is frequently indicated by the term Long Term Evolution (LTE), and is also associated with terms like System Architecture Evolution (SAE). One target of EUTRAN is to enable all internet protocol (IP) systems to efficiently transmit IP data. The system will have only use a PS (packet switched) domain for voice and data calls, i.e. the system will contain Voice Over Internet Protocol (VoIP).

Information about LTE can be found in 3GPP TS 36.300 (V8.0.0, March 2007), *Evolved Universal Terrestrial Radio Access (E-UTRA) and Evolved Universal Terrestrial Radio Access Network (E-UTRAN)—Overall description; Stage* 2 (*Release* 8), which is incorporated herein by reference in its entirety. UTRAN and EUTRAN will now be described in some further detail, although it is to be understood that especially E-UTRAN is evolving over time.

The UTRAN consists of a set of Radio Network Subsystems 128 (RNS), each of which has geographic coverage of a number of cells 110 (C), as can be seen in FIG. 1. The interface between the subsystems is called Iur. Each Radio Network Subsystem 128 (RNS) includes a Radio Network Controller 112 (RNC) and at least one Node B 114, each Node B having geographic coverage of at least one cell 110. As can be seen from FIG. 1, the interface between an RNC 112 and a Node B 114 is called Iub, and the Iub is hard-wired rather than being an air interface. For any Node B 114 there is only one RNC 112. A Node B 114 is responsible for radio transmission and reception to and from the UE 102 (Node B antennas can typically be seen atop towers or preferably at less visible locations). The RNC 112 has overall control of the logical resources of each Node B 114 within the RNS 128, and the RNC 112 is also responsible for handover decisions which entail switching a call from one cell to another or between radio channels in the same cell.

In UMTS radio networks, a UE can support multiple applications of different qualities of service running simultaneously. In the MAC layer, multiple logical channels can be multiplexed to a single transport channel. The transport channel can define how traffic from logical channels is processed and sent to the physical layer. The basic data unit exchanged between MAC and physical layer is called the Transport Block (TB). It is composed of an RLC PDU and a MAC header. During a period of time called the transmission time interval (TTI), several transport blocks and some other parameters are delivered to the physical layer.

Generally speaking, a prefix of the letter "E" in upper or lower case signifies the Long Term Evolution (LTE). The E-UTRAN consists of eNBs (E-UTRAN Node B), providing the E-UTRA user plane (RLC/MAC/PHY) and control plane (RRC) protocol terminations towards the UE. The eNBs interface to the access gateway (aGW) via the S1, and are inter-connected via the X2.

An example of the E-UTRAN architecture is illustrated in FIG. 2. This example of E-UTRAN consists of eNBs, providing the E-UTRA user plane (RLC/MAC/PHY) and control plane (RRC) protocol terminations towards the UE. The eNBs are connected by means of the S1 interface to the EPC (evolved packet core), which is made out of Mobility Management Entities (MMEs) and/or gateways such as an access gateway (aGW). The S1 interface supports a many-to-many relation between MMEs and eNBs. Packet Data Convergence Protocol (PDCP) is located in an eNB.

In this example there exists an X2 interface between the eNBs that need to communicate with each other. For exceptional cases (e.g. inter-PLMN handover), LTE_ACTIVE inter-eNB mobility is supported by means of MME relocation via the S1 interface.

The eNB may host functions such as radio resource management (radio bearer control, radio admission control, connection mobility control, dynamic allocation of resources to UEs in both uplink and downlink), selection of a mobility management entity (MME) at UE attachment, scheduling and transmission of paging messages (originated from the MME), scheduling and transmission of broadcast information (originated from the MME or O&M), and measurement and measurement reporting configuration for mobility and scheduling. The MME may host functions such as the following: distribution of paging messages to the eNBs, security control, IP header compression and encryption of user data streams; termination of U-plane packets for paging reasons; switching of U-plane for support of UE mobility, idle state mobility control, System Architecture Evolution (SAE) bearer control, and ciphering and integrity protection of NAS signaling.

Incorporated herein in its entirety is TSG-RAN WG1 #50, R1-073842, Athens, Greece, Aug. 20-24, 2007: "Notes from uplink control signaling discussions." In RAN1 #50 held in Athens, many assumptions related to control signalling on PUSCH were agreed upon.

- Data and the different control fields (ACK/NACK, CQI/PMI) are mapped to separate modulation symbols. Here, ACK stands for acknowledgement, NACK stand for negative acknowledgement, and CQI stands for channel quality indicator.
- Different coding rates for control is achieved by occupying different number of symbols
- The coding rate to use for the control signalling is given by the PUSCH MCS. The relation is expressed in a table.
- A table links each PUSCH MCS with a given coding rate for control signalling, i.e., the number of symbols to use for an ACK/NAK or a certain CQI/PMI size.

Also incorporated by reference herein (in its entirety) is 3GPP TSG RAN WG1, Meeting #52bis, R1-081165 held in Shenzhen, China, 31 Mar.-4 Apr. 2008. Also incorporated by reference herein (in its entirety) is 3GPP TSG RAN1#52-Bis, R1-081295, Shenzhen, China, Mar. 31-Apr. 4, 2008: "Resource Provision for UL Control in PUSCH." The multiplexing described above was further sharpened in RAN1 #52bis:

- CQI/PMI on PUSCH uses the same modulation scheme as data on PUSCH
- Semi-statically configured offset between the data MCS and the code rate of the control signaling is applied (A/N and CQI)
- Next steps: Define the offset values. Discuss whether multiple offsets are needed e.g. when multiple services with different Quality of Service (QoS) are time multiplexed.

The existing technology does not address how to link the PUSCH MCS and amount of resources for control on PUSCH, or how to guarantee sufficient quality for uplink (UL) control signals when multiplexed with UL data. There are certain issues which need to be taken into account when allocating resources for control signals:

1. Control Channel Quality
    ACK/NACK and CQI have tight requirements in terms of B(L)ER performance
    Re-transmission cannot be applied with control signals due to delay requirements
2. Data Dominance
    Data quality defines the operation point for MCS selection and PUSCH power control
    Control channels must adapt into the given SINR operation point
    Information about the symbol split between data and control must be pre-known at both ends of the radio link in order to perform correct rate matching/de-matching and encoding/decoding operations for different channels
3. Different B(L)ER Operation Point
    Data channel utilizes Hybrid Automatic Repeat Request (HARQ) and Link Adaptation (LA) whereas control signalling benefits neither from the fast link adaptation nor the HARQ
    Channel coding
    Data channel has Turbo coding and much larger coding block size
    Control channel has relatively small code block size and smaller coding gain (ACK/NACK has only repetition coding)

There is essentially no prior art available for detailed solutions for the problem described above. R1-081295 presents a formula to determine the size of control region based on the data MCS level. However there are several disadvantages in the solution presented in R1-081295. For example:

- Useless term, Kc (can be combined with the offset parameter)
- Useless function, log 2( ), (can be combined with the offset parameter)
- "Un-defined" relationship between Data MCS and size of the control channel
- No performance results are presented in R1-081295 to show the feasibility of this formula.

These disadvantages require solutions in order to adequately solve the problems described above, and guarantee sufficient quality for UL control signals when multiplexed with UL data.

SUMMARY OF THE INVENTION

The present invention is applicable in the context of the E-UTRAN (LTE or 3.9G). However, its principles are not limited to such an environment, and instead may also be applicable to various other current and future wireless telecommunications systems and access technologies.

An embodiment of the present invention relates, for example, to the UL part of the UTRAN long term evolution (LTE) which is being specified in the 3GPP under the Rel. 8 Work Item, and also relates to resource allocation for non-data-associated control signals (such as ACK/NACK and CQI) transmitted with UL data on the PUSCH (Physical Uplink Shared Channel). Data non-associated control signalling can be multiplexed with UL data by means of time division multiplexing (TDM).

Included in the present invention is a method and apparatus for linkage between Physical Uplink Control Channel (PUSCH) Modulation and Coding Scheme (MCS) and amount of resources for control on PUSCH. According to certain embodiments of the present invention, a mechanism and/or formula are presented for scaling the amount of control resources (CQI & ACK/NACK), allowing for flexible adaptation of the size of control region for controlling the quality of the control channel. This allows for the adaptation of quality of UL control signaling in order to meet target requirements.

BRIEF DESCRIPTION OF THE DRAWINGS

FIG. 8 shows different BW options performing almost equally.

FIG. 10 shows decisions regarding control signaling on PUSCH, and open issues.

FIG. 11 shows a proposed scheme according to an embodiment of the present invention.

Figure 18:
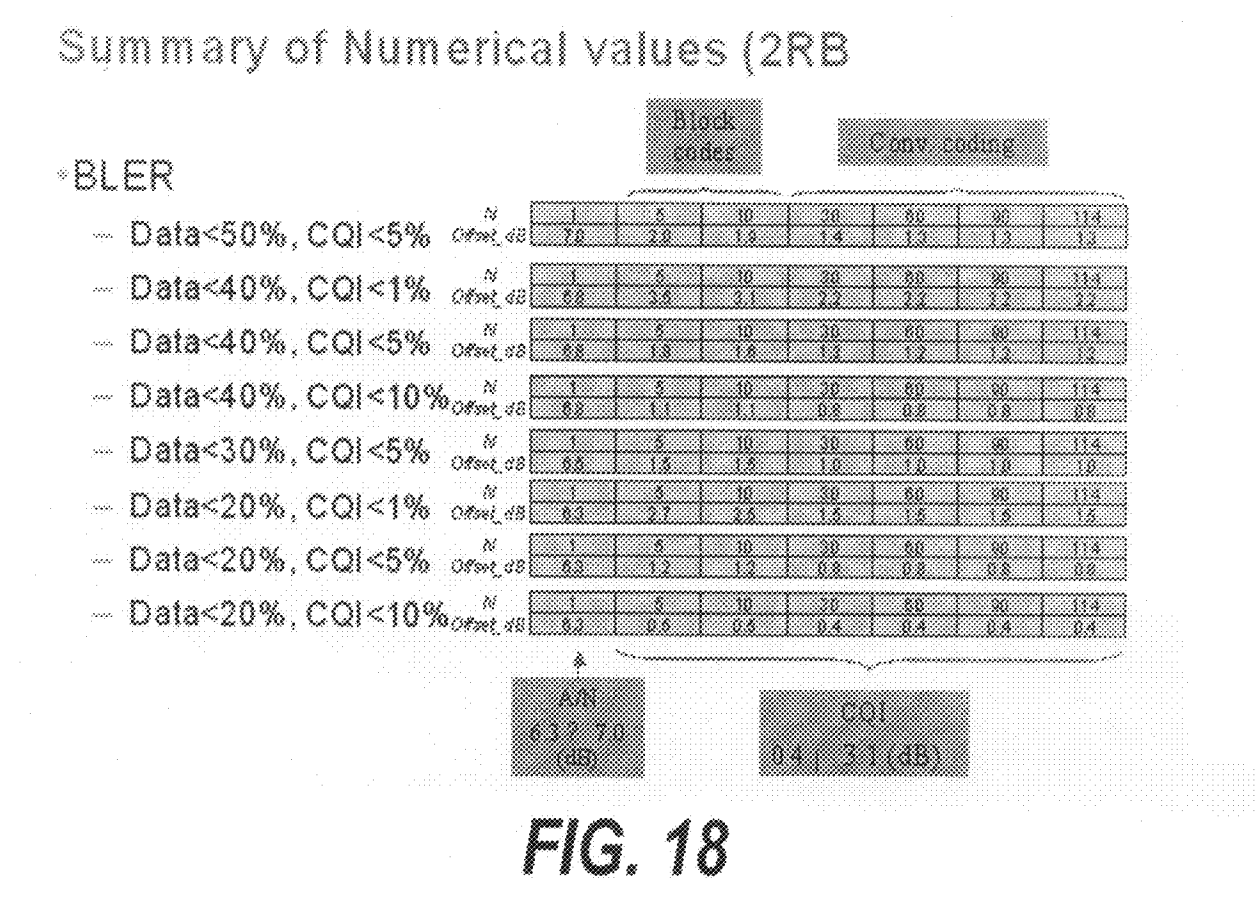

FIG. 18 is a summary of numerical values.

FIG. 19 describes aspects of signaling.

FIG. 20 lists observations.

FIG. 21 describes improved DTX detection.

FIG. 22 provides simulation assumptions.

FIG. 28 shows RAN1 Status.

FIG. 29 shows a proposed formula to determine the size of control region based on data MCS.

Figure 36:
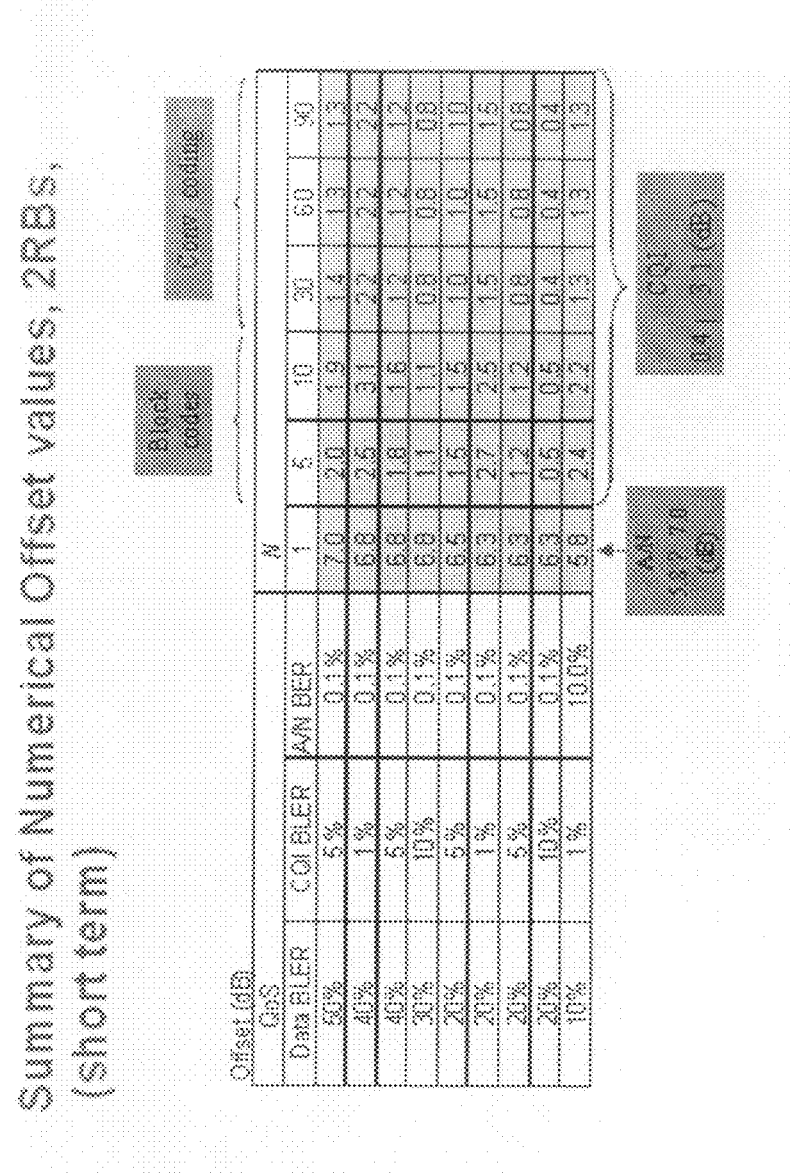

FIG. 36 is a summary of numerical offset values, 2 RBs (short term).

FIG. 38 shows conclusions.

DETAILED DESCRIPTION OF THE INVENTION

A preferred embodiment of the present invention will now be described. This is merely to illustrate one way of implementing the invention, without limiting the scope or coverage of what is described elsewhere in this application.

This embodiment of the invention provides a method and procedure to determine the size of the control signal region with a number of pre-defined input parameters. This embodiment of the invention contains an algorithm that utilizes those parameters as an input. The goal is to standardize the method and procedure such that both UE and eNodeB would utilize it.

Another topic covered by this embodiment is the arrangement supporting the enhanced DTX detection of ACK/NACK at the eNB. This is achieved by means of special ACK/NACK dimensioning.

Generally speaking, a DTX situation relates to the failure of DL resource allocation grant. When DL resource allocation fails the ACK/NACK(s) associated with the PDCCH is missing from the given UL sub-frame because the UE has missed the DL allocation and therefore has no reason to include an ACK/NACK. If existence of ACK/NACK is not signaled in UL grant, the Node B cannot know that the ACK/NACK is not present and may therefore interpret the reception incorrectly. The performance of reception could improved, if the existence of A/N bit is signaled in UL PUSCH. In the context of this study, we refer to this signalling as DTX signaling.

Figure 1:
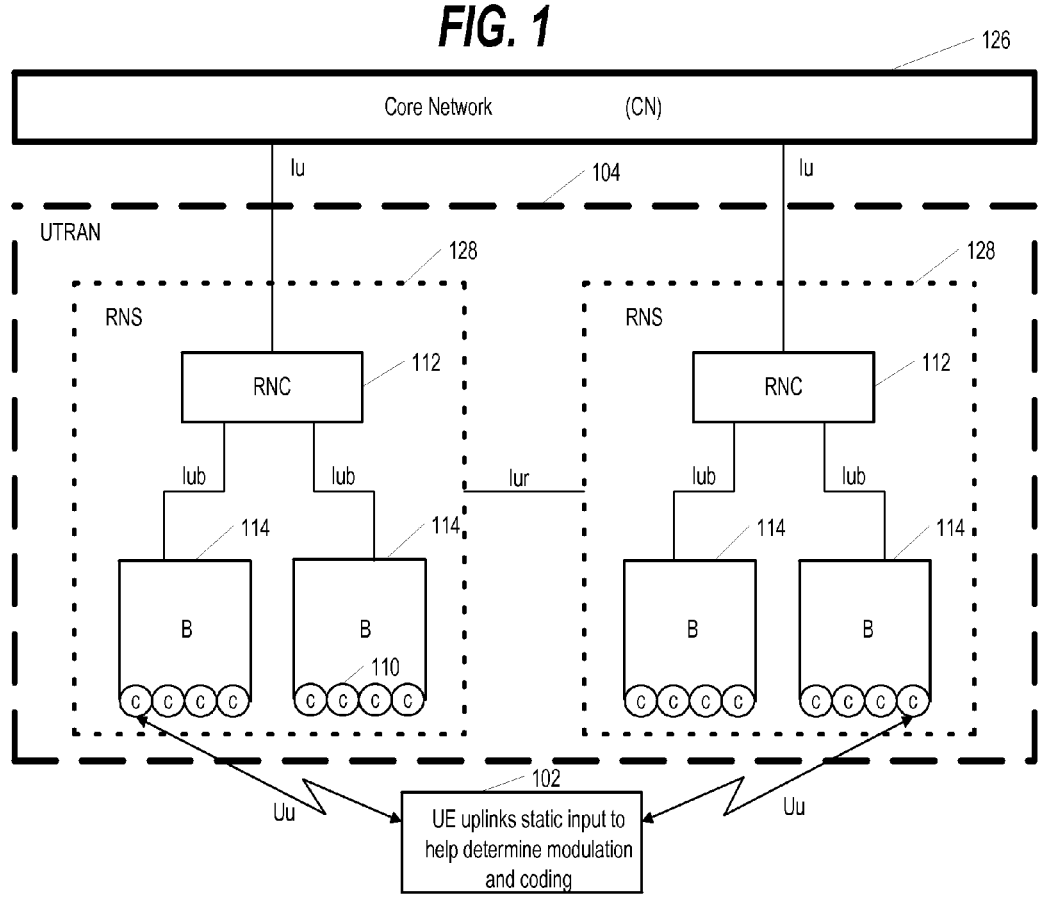
FIG. 1 shows a UTRAN network.
Figure 2:
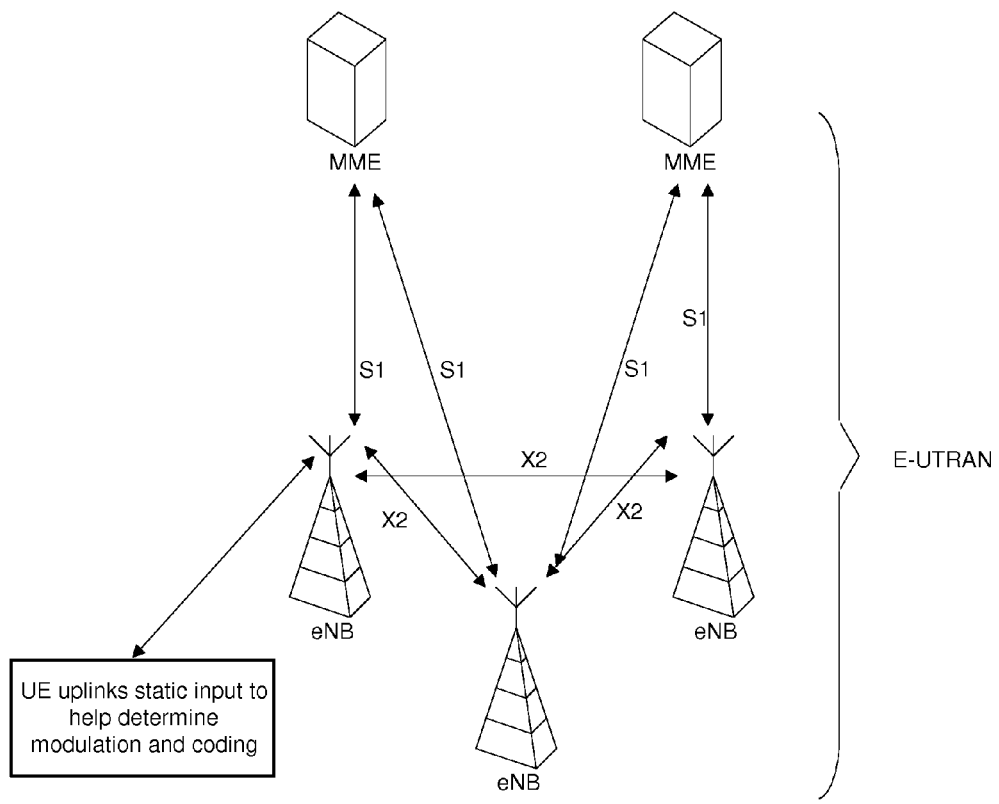
FIG. 2 shows an LTE architecture.
Figure 3:
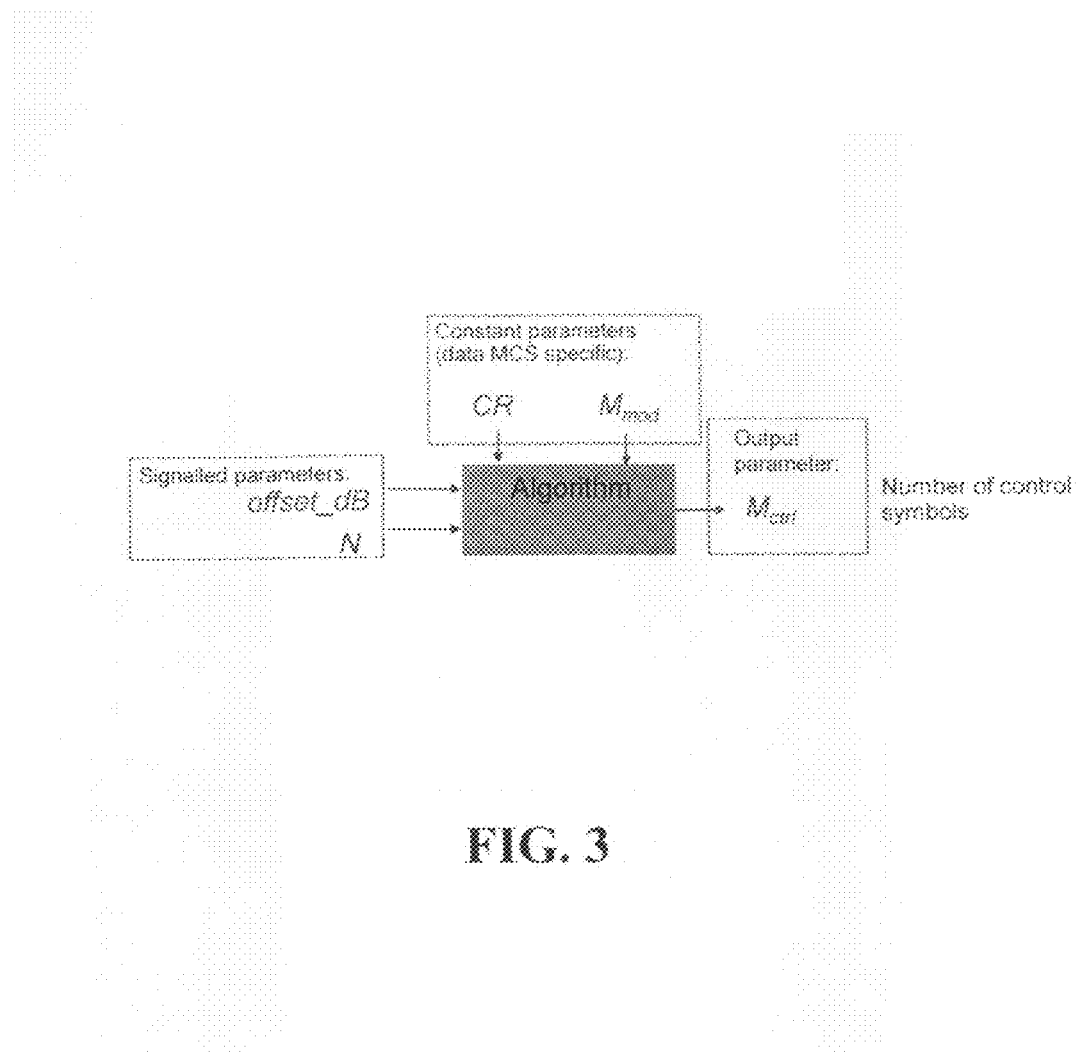
FIG. 3 shows input and output parameters of proposed resource allocation scheme.

The basic functionality for defining the size of a control region is illustrated in FIG. 3. The proposed resource allocation scheme contains "semi-static" input parameters signalled via higher layers: offset_dB, which is the quality difference between the given control channel and PUSCH data channel; and N which is the number of control signaling bits (for the given control signaling type). The static input parameters (UL data MCS-specific) are: coding rate (CR) of given MCS of UL data channel (e.g., 3/1); and, Mmod (i.e., $M_{mod}$) which is the number of uncoded bits/symbol [2, 4 or 6 with QPSK, 16 QAM, 64 QAM] for the given UL data MCS. The output parameter, Mctrl (i.e. $M_{ctrl}$), is the number of control symbols/TTI for a certain number of control signaling bits (N).

Mctrl relates to a given modulation and coding scheme used in the UL. An algorithm to calculate Mctrl, can be illustrated as follows:

$$M_{ctrl} = \left\lceil \frac{N \cdot \frac{CR}{M_{Mod}}}{10^{\frac{-offset\_dB}{10}}} \right\rceil$$

where the fraction in the numerator is the number of (coded) bits/resource element (i.e., symbol) for the given data MCS, and ⌈ ⌉ is the ceil operation, which rounds the elements of the nearest integers, towards plus infinity. It should be noted that the term $$\frac{CR}{M_{Mod}}$$

can be also expressed using the following parameters:

number of input bits $K_{bits}^{PUSCH}$ (number of transmitted bits after code block segmentation)

$M_{SC}^{PUSCH} \cdot N_{symb}^{PUSCH}$ (total number of sub-carriers per subframe carrying PUSCH multiplied by the number of SC-FDMA symbols carrying PUSCH)

This relationship can be expressed as:

$$\frac{CR}{M_{Mod}} = \frac{M_{SC}^{PUSCH} \cdot N_{symb}^{PUSCH}}{K_{bits}^{PUSCH}}$$

Improved DTX detection can be accomplished in a situation where the explicit DTX signaling (e.g., such as 1 bit included in UL grant) is not present. In these cases, it is possible to always reserve Mctrl symbols and transmit NACK or DTX using this symbol space. However, the problem of this approach is the excessive control overhead.

One way to improve DTX detection is to define the control signaling size such that a certain number of ACK/NACK symbols are always reserved. The idea can be presented as follows:

$$M_{ctrl} = \max\left(\left\lceil \frac{N \cdot \frac{CR}{M_{Mod}}}{10^{\frac{-offset\_dB}{10}}} \right\rceil, K\right)$$

where K is a predetermined number, e.g., 8-10. This number is selected in such that it will provide sufficient DTX detection performance while maintaining reasonable control overhead. The procedure is such that in the case when ACK/NACK is present, then the number of A/N (i.e. ACK/NACK) symbols is calculated based e.g., on the equation above. In the case when ACK/NACK is absent, then K symbols are still reserved. In these cases, UE can signal either NACK or DTX. Benefit of this arrangement is that control overhead is reduced and, at the same time DTX performance is always guaranteed.

An embodiment of the present invention can be implemented by means of functionality shown in FIG. 3. In one of the preferred embodiments, both UE and eNB contain the same functionality to define Mctrl. The method comprises: (1) eNB defines the offset_dB; (2) eNB signals offset_dB parameter to the UE; (3) UE calculates Mctrl and transmits the given control signalling type using Mctrl resource elements (symbols) located on a pre-determined places; (4) eNB calculates Mctrl and receives the given control signalling type using Mctrl resource elements (symbols) located on a pre-determined places.

In another embodiment, the offset_dB is defined separately for different PUSCH bandwidths (or preferably for a group PUSCH bandwidths). An example of this is shown as follows (two groups):
  offset_dB__1 for BW<K RBs (K is a pre-determined number, e.g., 5)
  offset_dB__2 for BW=K RBs In yet another embodiment, the offset_dB parameter is defined separately for different MCSs (or preferably a group of MCSs). An example of this is shown below (two groups):
  offset_dB__1 for QPSK
  offset_dB__2 for 16 QAM and 64 QAM In yet another embodiment, the offset_dB parameter is defined separately for different service types
  offset_db__1 for delay critical services
  offset_dB__2 for delay non-critical data (low HARQ operation point)

In yet another embodiment, the offset_dB parameter is defined separately for different control channels
  offset_dB__1 for ACK/NACK (N=1 or 2 bits)
  offset_dB__2 for CQI, N=5 bits
  offset_dB__3 for CQI, N=100 bits In yet another embodiment, a safety margin of X dB is applied on top of the offset_dB-parameter.

With regard to signalling, an offset_dB-parameter is signaled via higher layers (e.g., RRC signaling). An (initial) offset_dB related to ACK/NACK can be part of broadcast signaling. Persistent UEs (i.e., those having no dynamical UL grant available) can have offset_dB parameter included in the resource allocation grant With regard to definition of offset_dB-value, an embodiment of the present invention includes a method wherein the offset_dB is defined according to the following procedure: Block Error Ratio (BLER) of UL data channel (w/o HARQ) is limited into a certain number (e.g., 40%); BLER of control channel is limited into a certain number (e.g., 10%); find an offset_dB value which satisfies the quality criteria, which is an initial value for the offset_dB-parameter (may depend also on the operation environment such as channel profile, UE speed) and can be tabulated as a default offset_dB parameter at the NB; and increase/decrease the offset_dB value based on the measured data/control quality.

Various modifications can be made regarding the DTX issue, while remaining within the scope of the present invention. Now, two novel embodiments will be described; let us call them Option 1 and Option 2.

If no ACK/NACK to be signaled on PUSCH, then Option 1 involves always reserving K symbols. However, Option 2 involves always reserving L1 symbols, L1 depending upon the data MCS and another offset_dB-parameter (offset_DTX_dB).

$$L1 = \left\lceil \frac{N \cdot \frac{CR}{M_{Mod}}}{10^{\frac{-offset\_DTX\_dB}{10}}} \right\rceil$$

If ACK/NACK is to be signaled on PUSCH, then Option 1 involves using L2 symbols to signal A/N. Alternatively, Option 2 involves reserving L3 symbols to signal A/N, or using Mctrl symbols to signal A/N.

$$L2 = \max(M_{ctrl}, K)$$

$$L3 = \max(M_{ctrl}, L1)$$

Figure 4A:
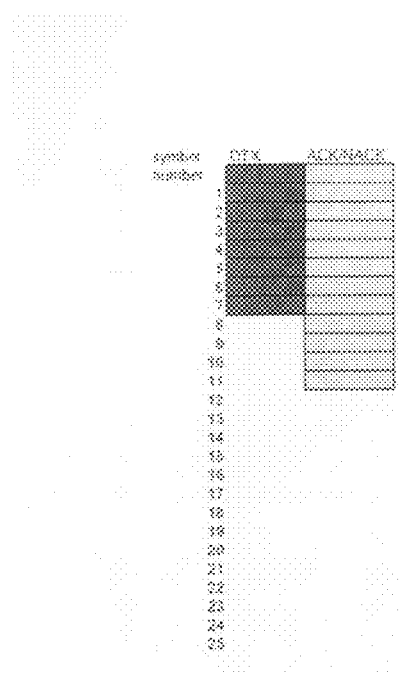
FIG. 4 shows four different embodiments of symbol space for discontinuous transmission (DTX) and ACK/NACK.
Figure 4B:
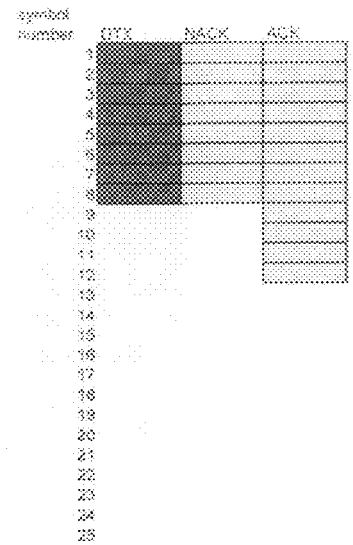

A further embodiment of the invention is one where DTX and ACK/NACK share an overlapping symbol space. ACK/NACK can utilize different symbol space than DTX, as shown in FIG. 4A. Or, DTX/NACK can utilizes the same symbol space, as shown in FIG. 4B.

Figure 4C:
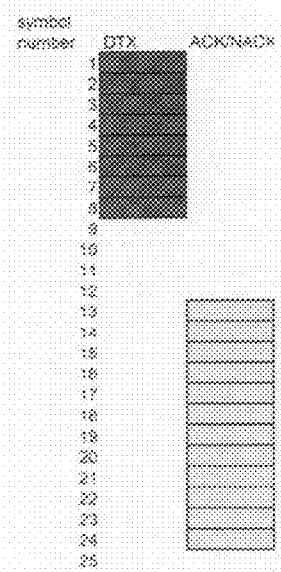
Figure 4D:
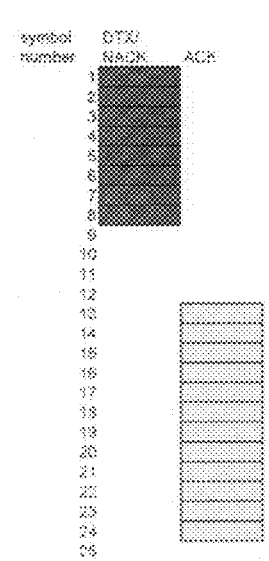
Figure 5:
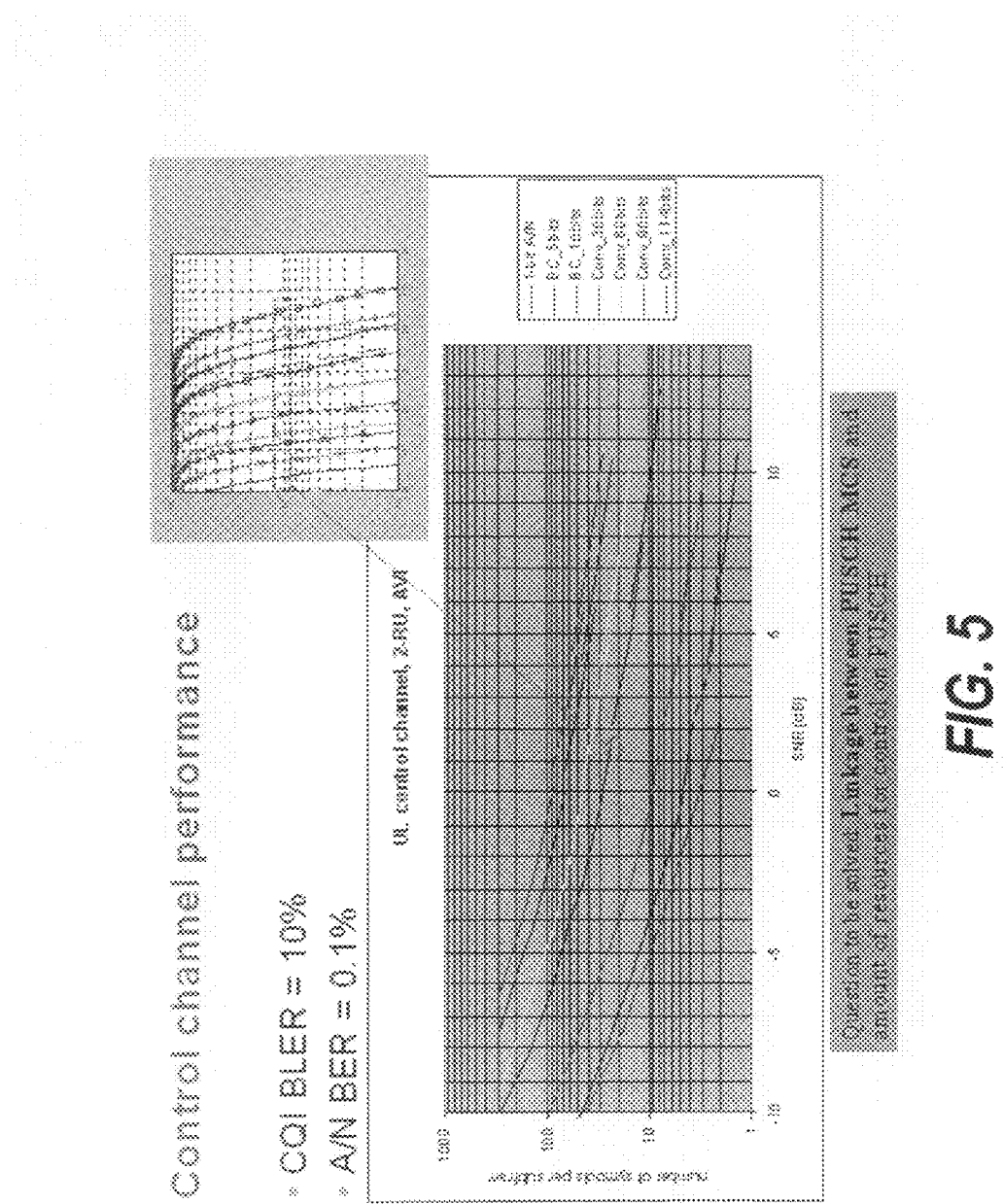
FIG. 5 shows linkage between PUSCH MSC and amount of resources for control on PUSCH.
Figure 6:
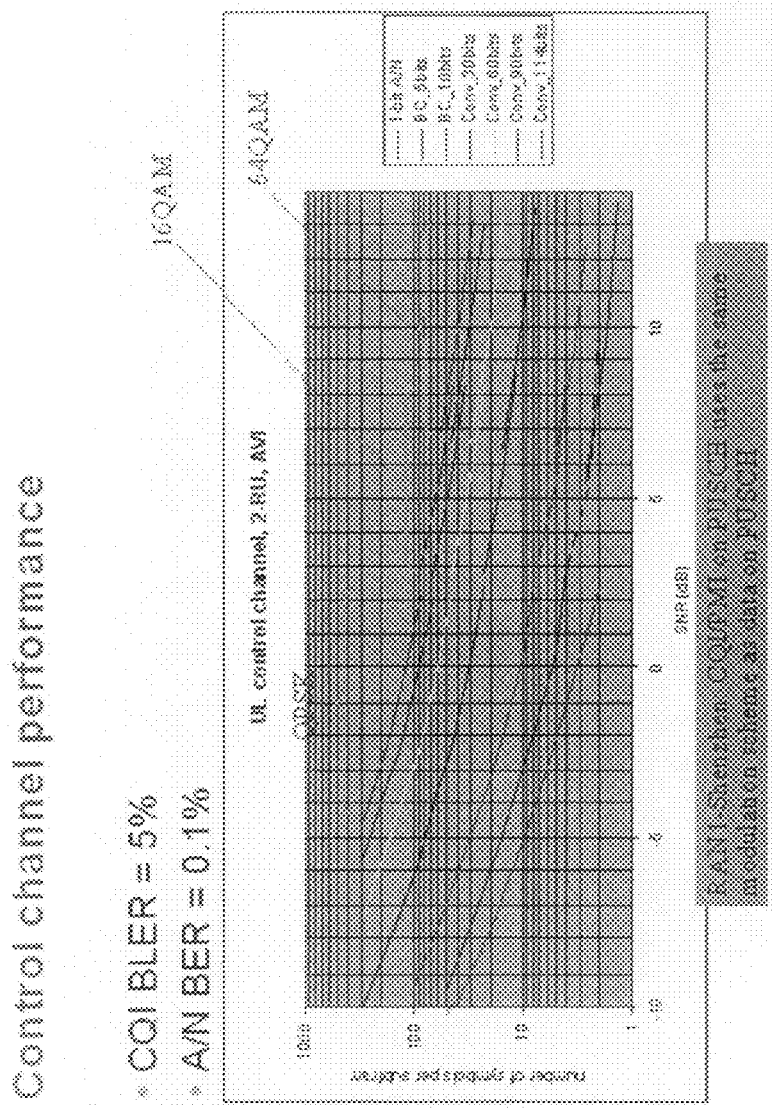
FIG. 6 shows CQI/PMI on PUSCH using the same modulation scheme as data on PUSCH.
Figure 7:
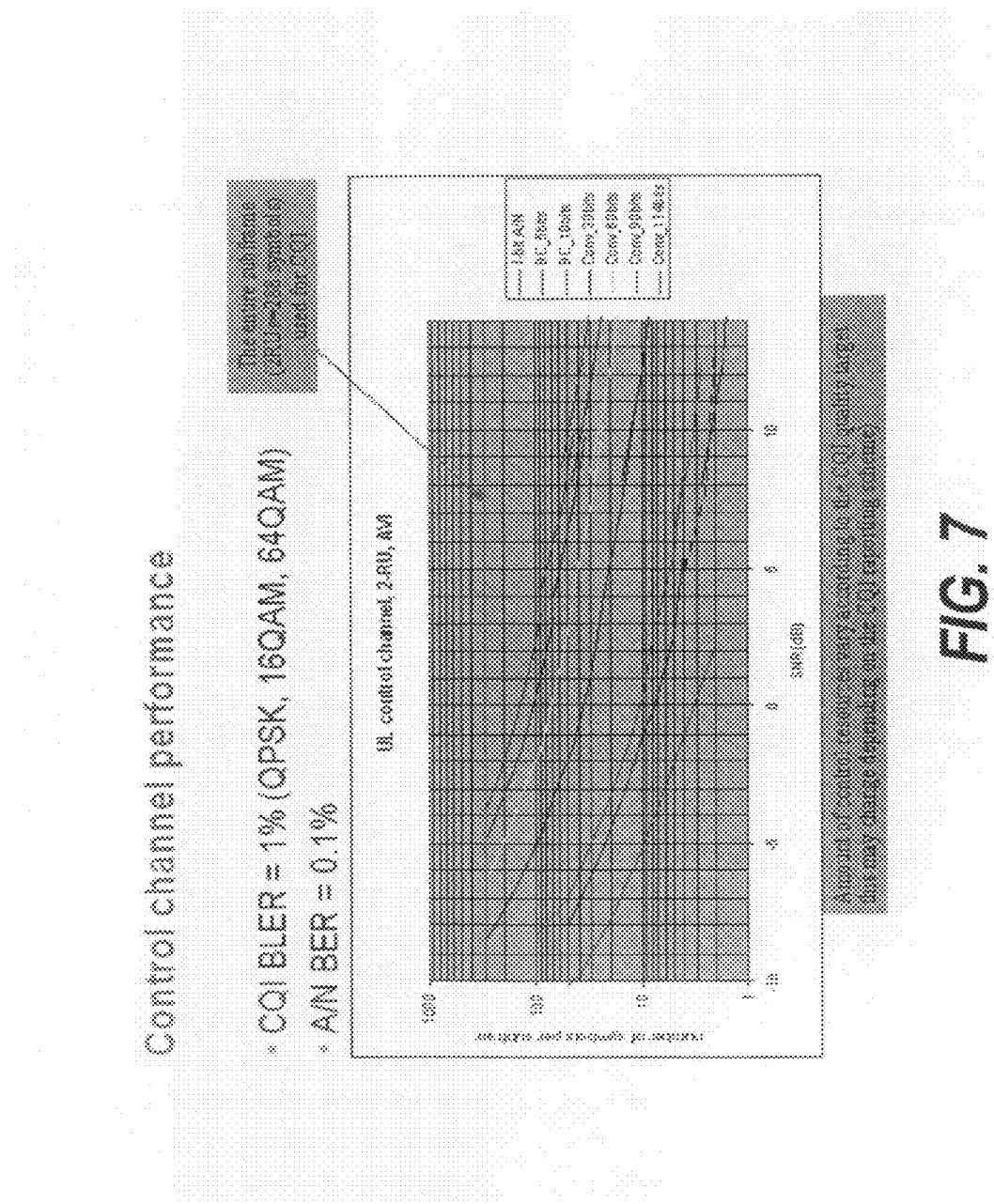
FIG. 7 shows how amount of control resources vary according to the CQI quality target.
Figure 9:
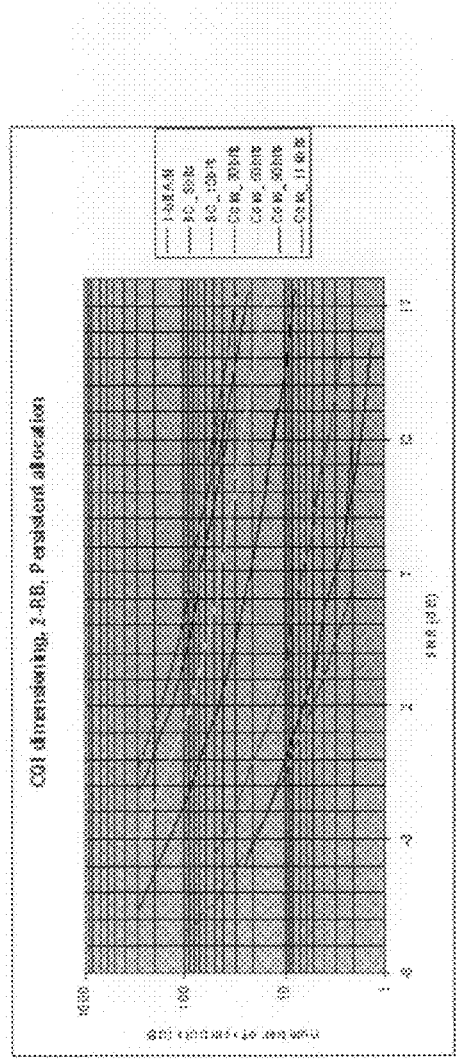
FIG. 9 shows the 2 RB case which is the most important case with persistent allocation.
Figure 12:
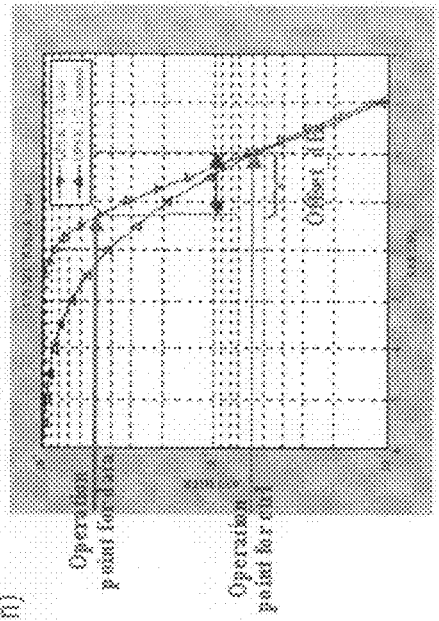
FIG. 12 shows offset_dB with BW allocation.
Figure 13:
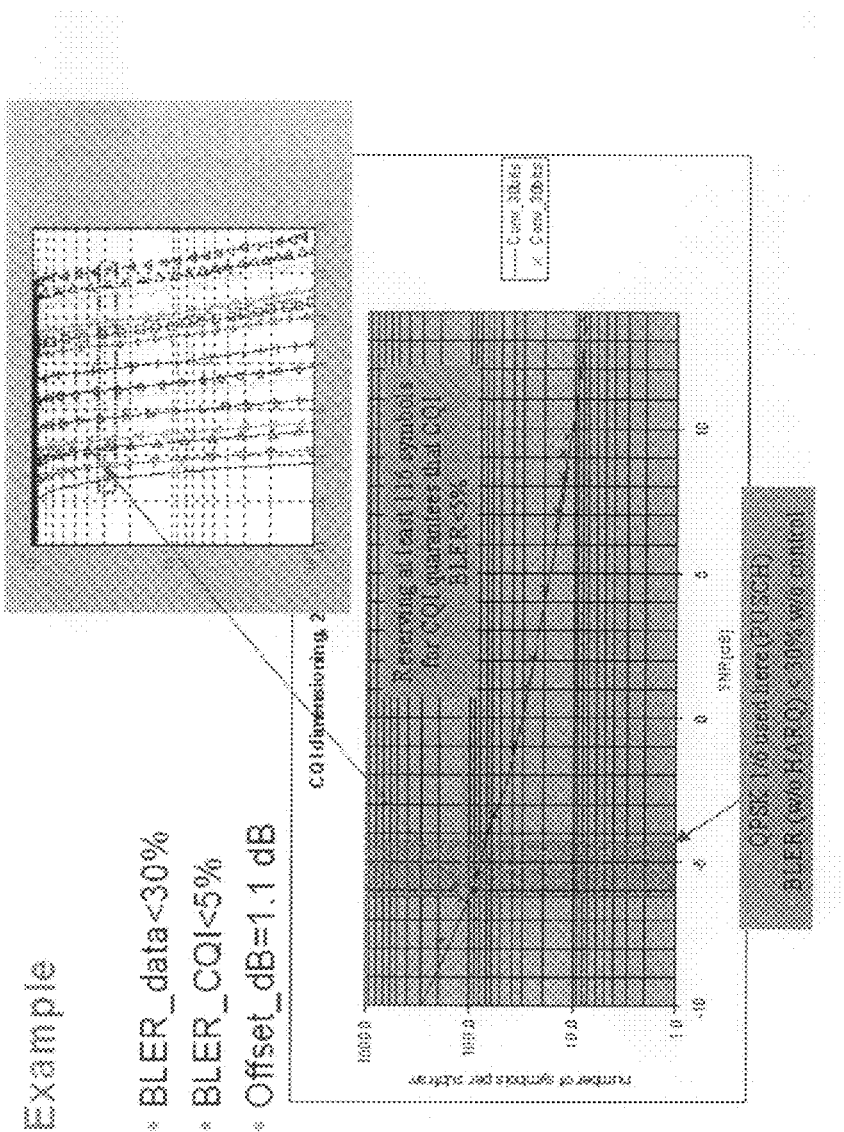
FIG. 13 is a BLER example.
Figure 14:
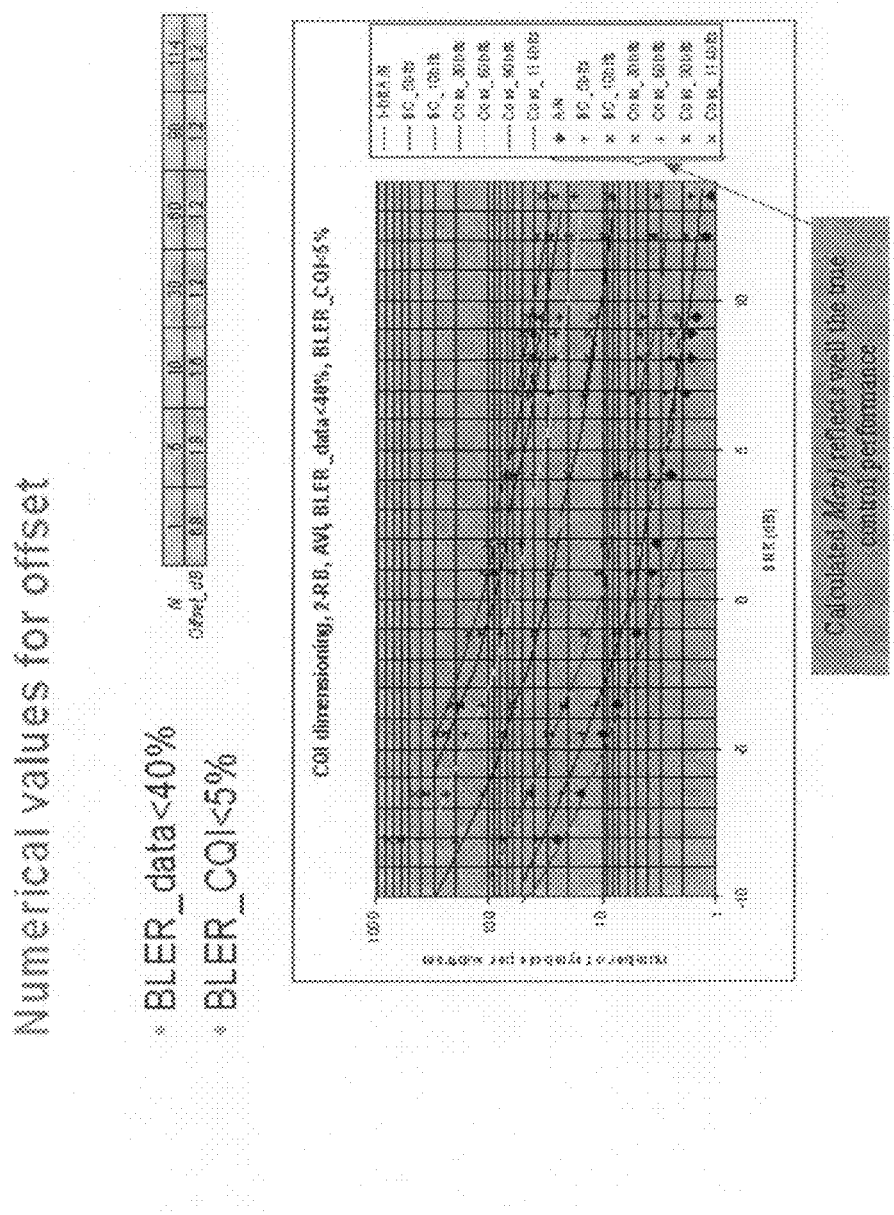
FIG. 14 shows numerical values for offset with BLER data less than 40%.
Figure 15:
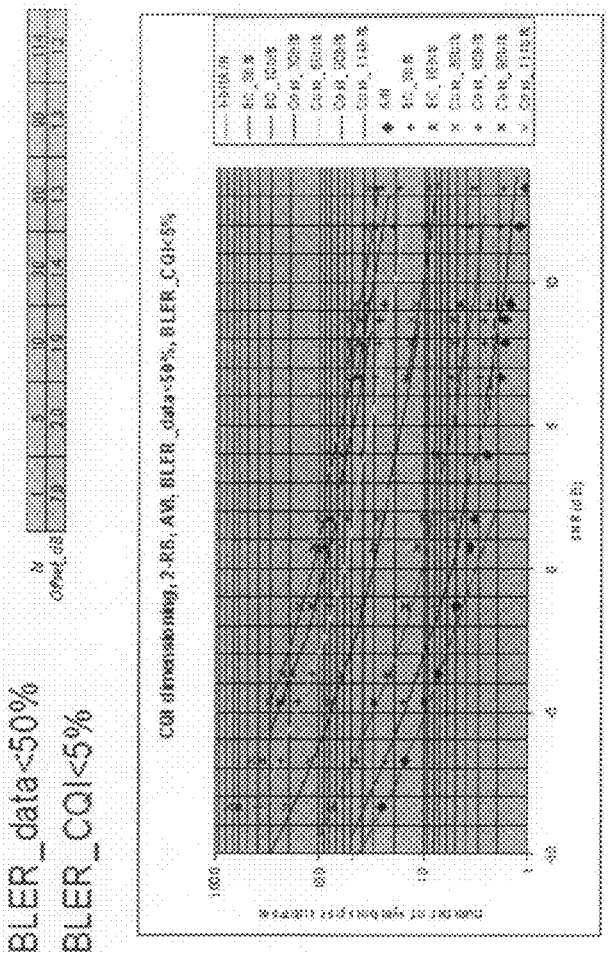
FIG. 15 shows numerical values for offset with BLER data less than 50%.
Figure 16:
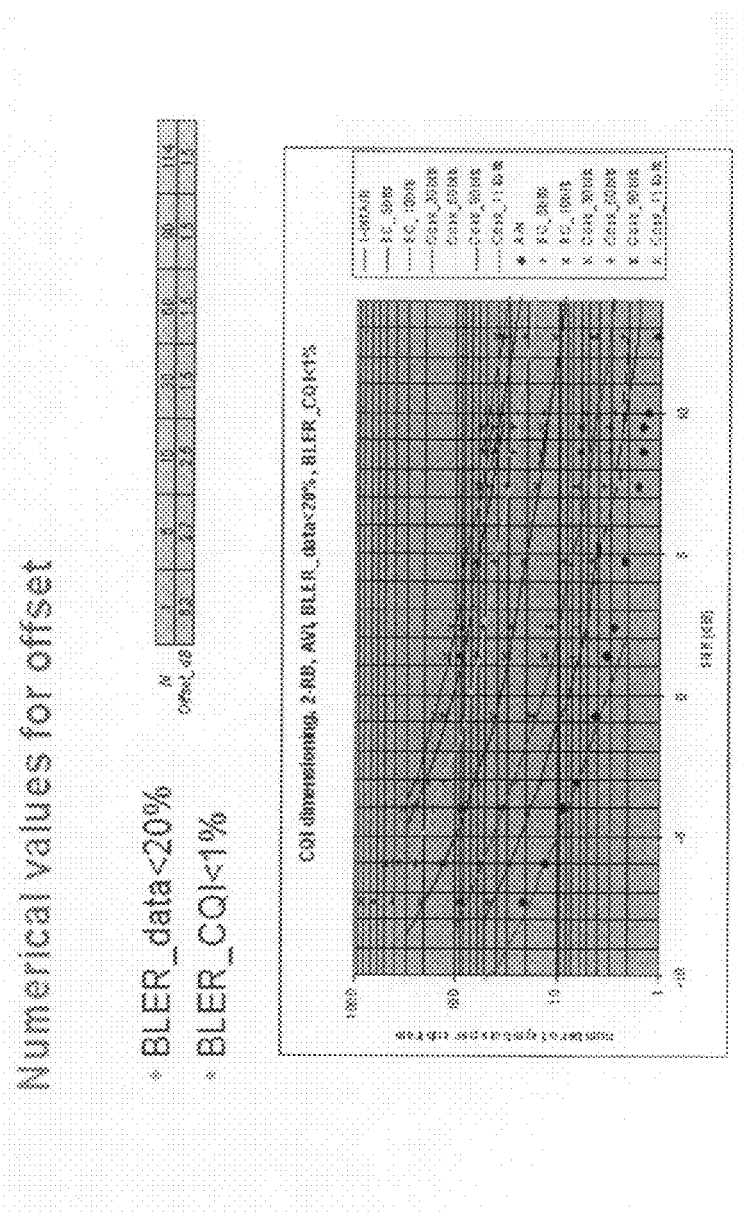
FIG. 16 shows numerical values for offset with BLER data less than 20%.
Figure 17:
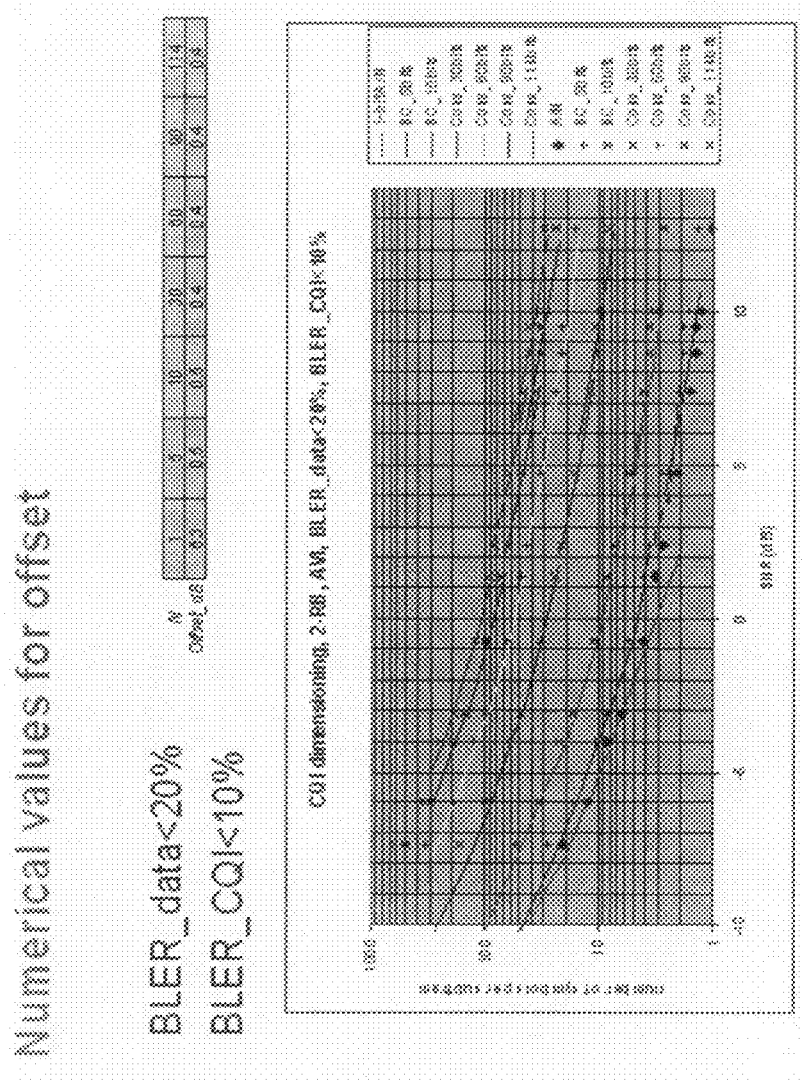
FIG. 17 shows numerical values for offset with BLER data less than 20% and BLER_CQI less than 10%.
Figure 23:
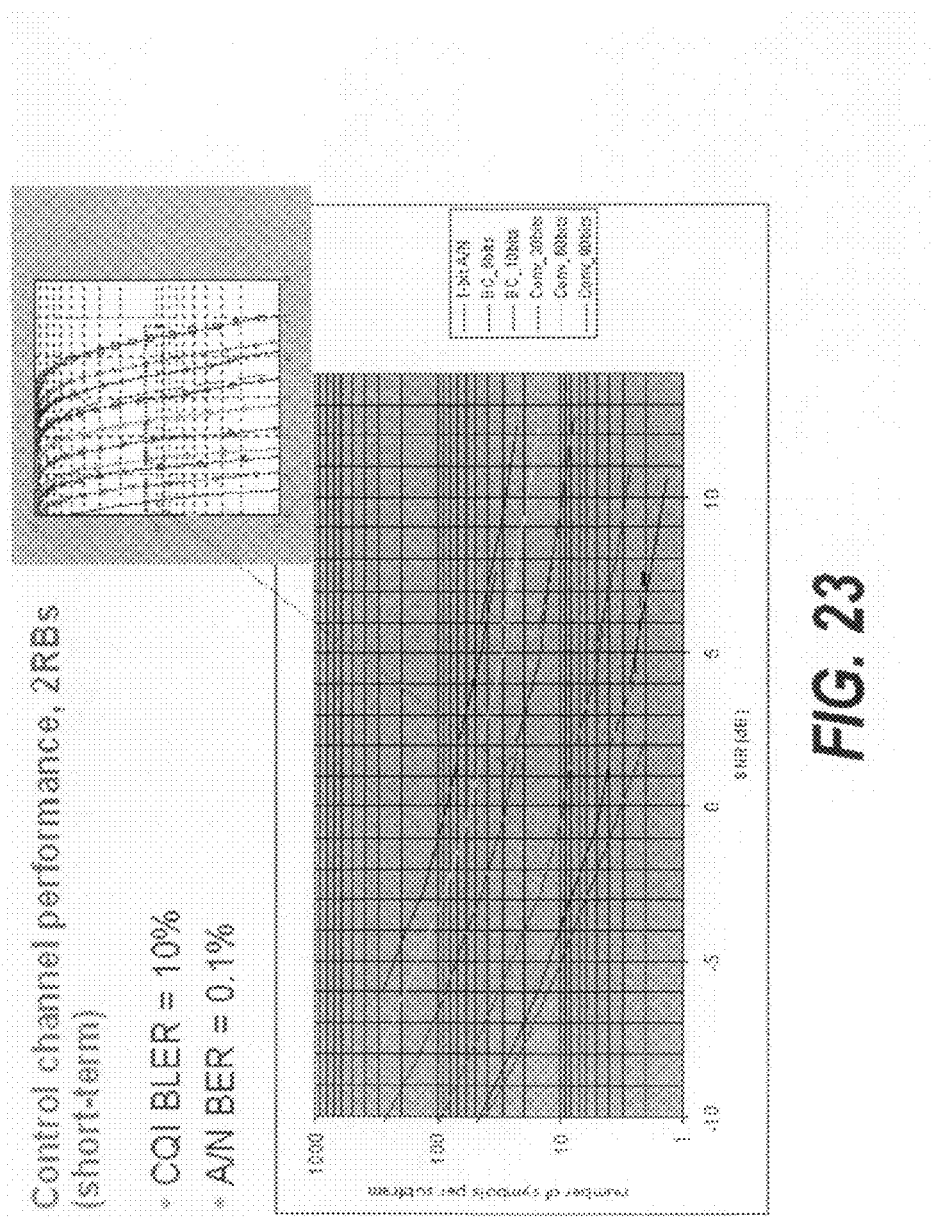
FIG. 23 shows control channel performance, 2 RBs (short-term) with CQI BLER equal to 10%.
Figure 24:
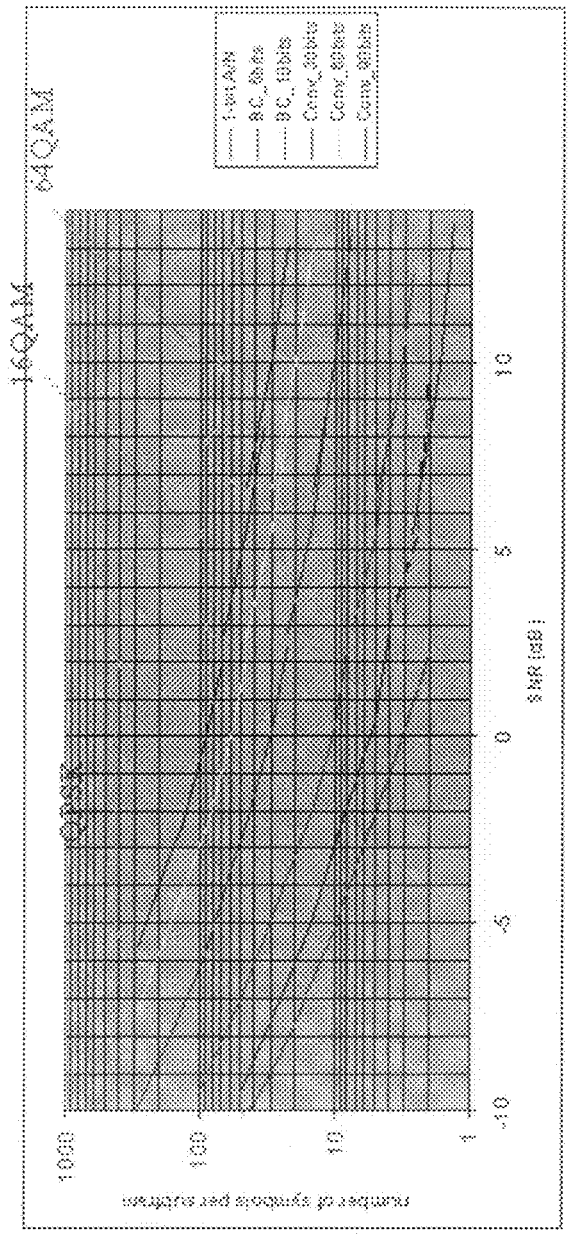
FIG. 24 shows control channel performance, 2 RBs (short-term) with CQI BLER equal to 5%.
Figure 25:
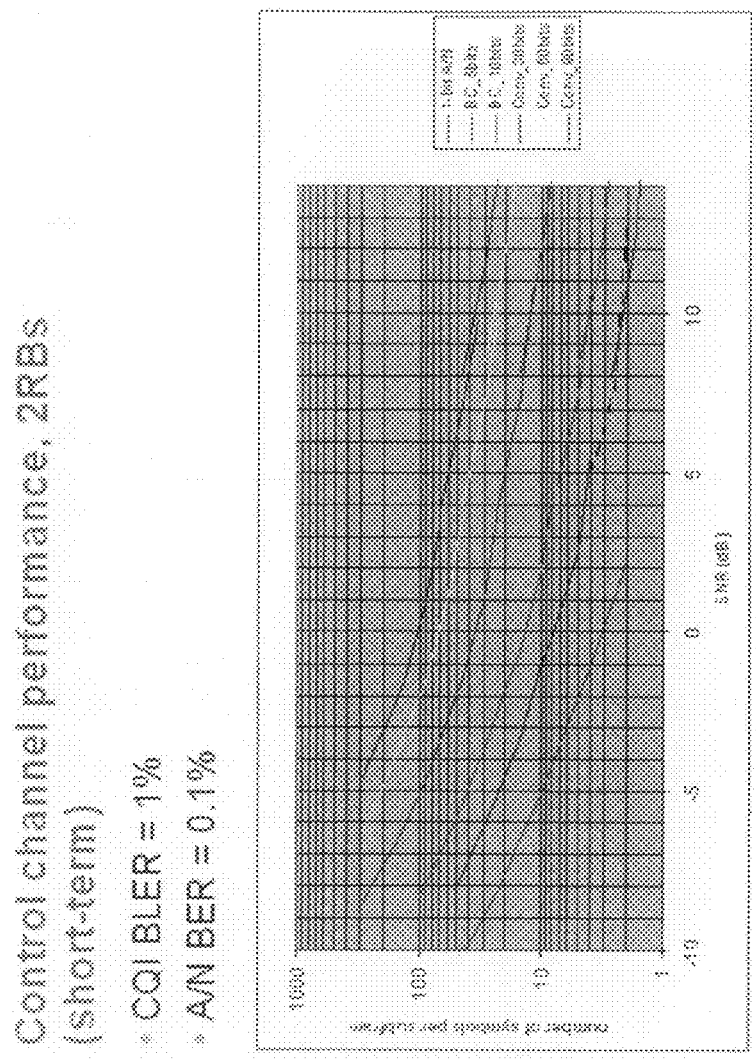
FIG. 25 shows control channel performance, 2 RBs (short-term) with CQI BLER equal to 1%.
Figure 26:
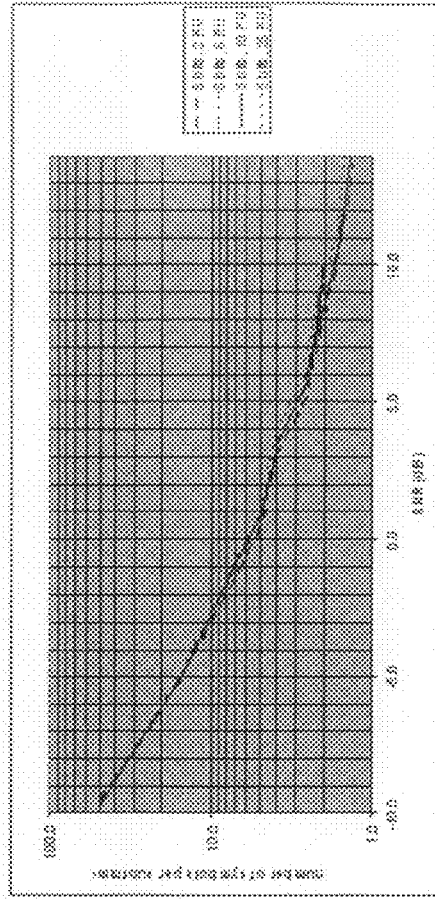
FIG. 26 shows control channel performance (short-term) performance comparison for different PUSCH BW options.
Figure 27:
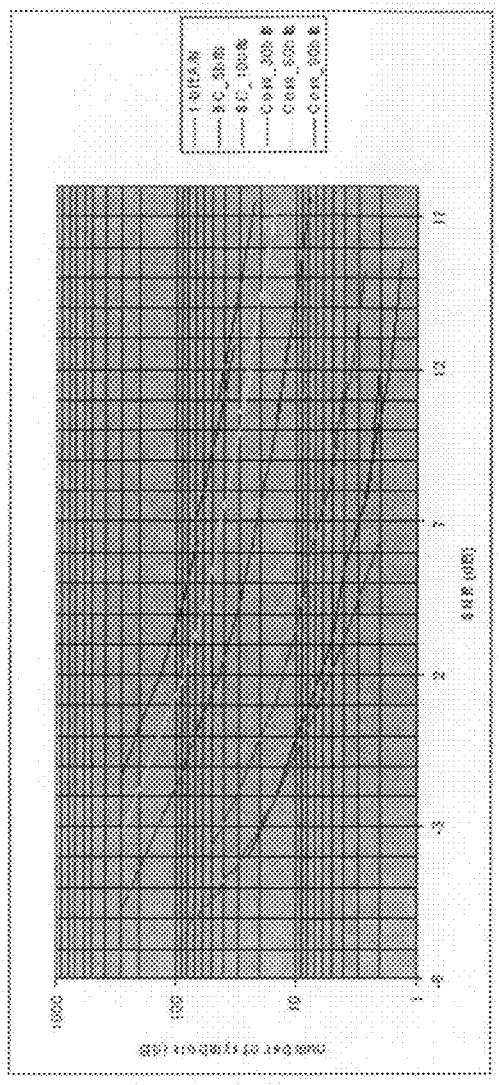
FIG. 27 shows control channel performance (long-term).
Figure 30:
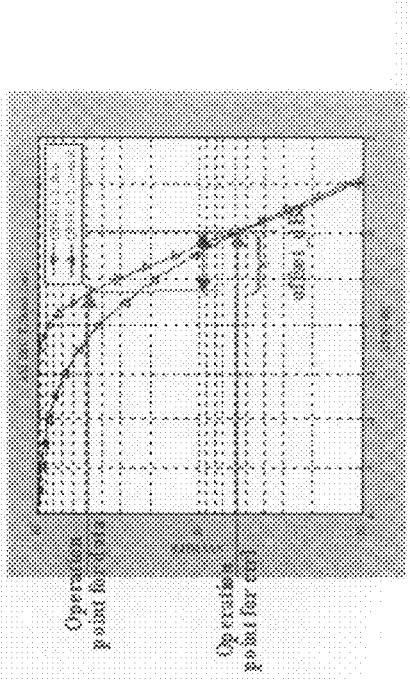
FIG. 30 shows offset_dB which compensates for the performance difference between the control and data channel.
Figure 31:
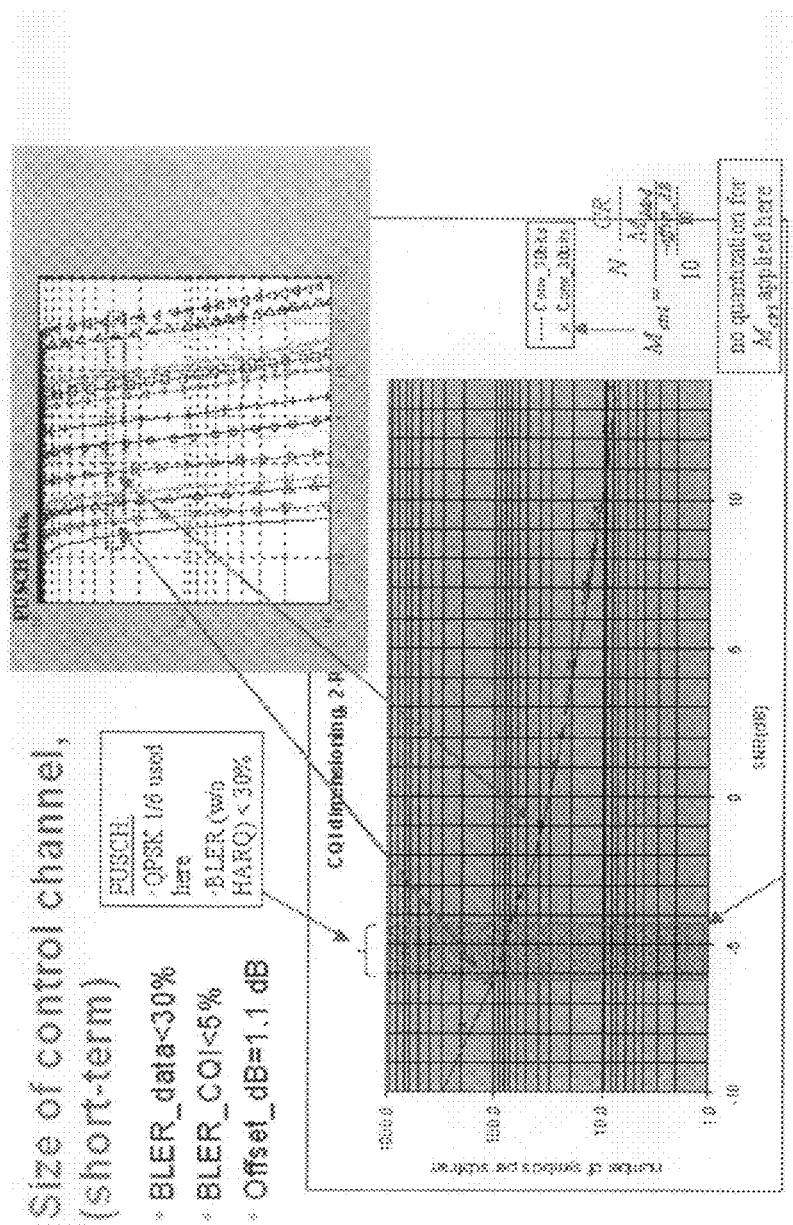
FIG. 31 shows size of the control channel (short term).
Figure 32:
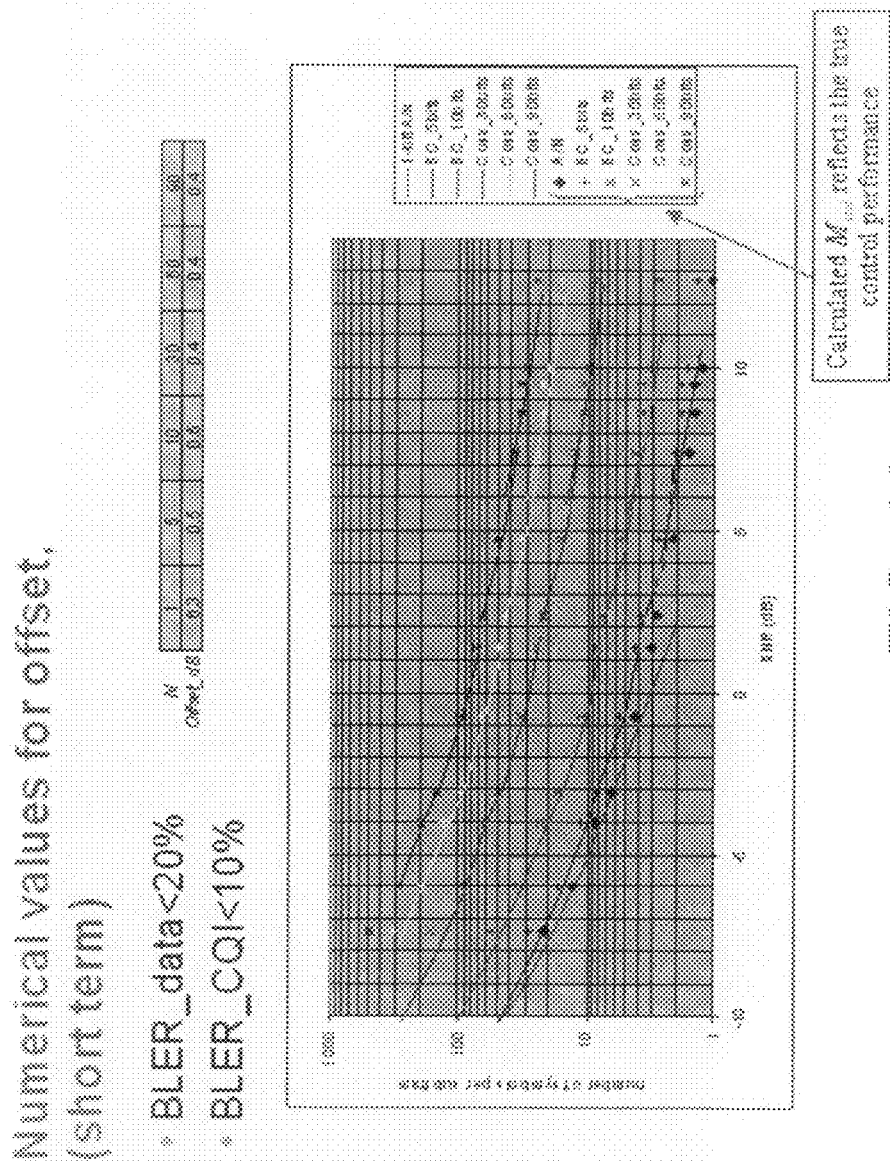
FIG. 32 provides numerical values for offset (short term) with BLER data less than 20%.
Figure 33:
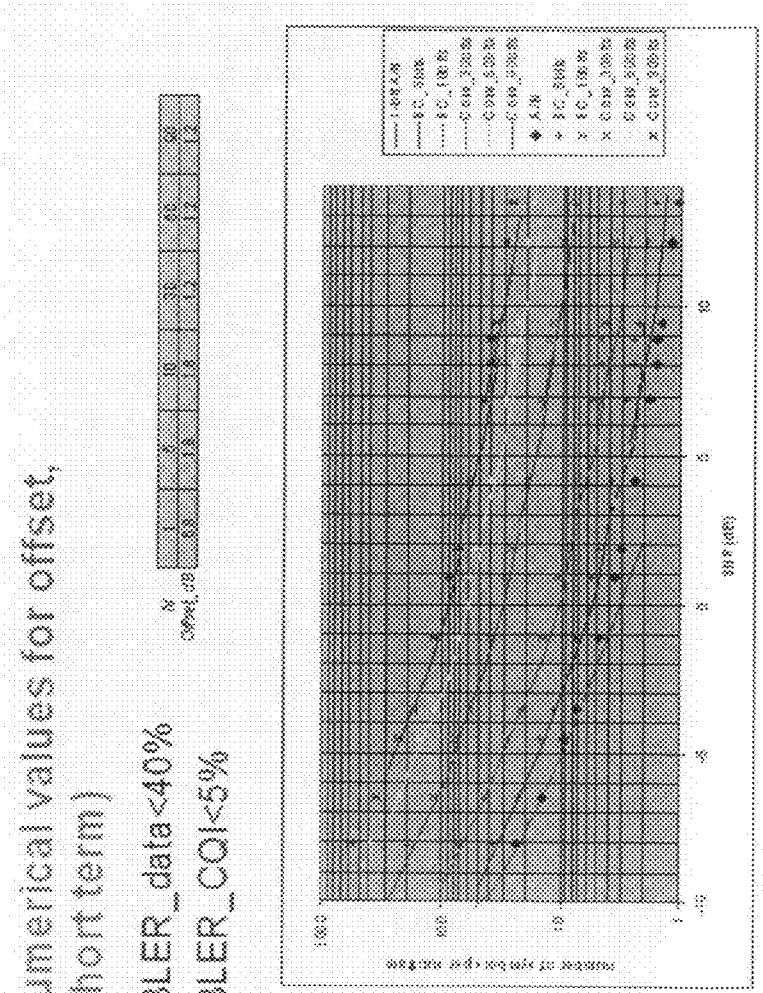
FIG. 33 shows numerical values for offset (short term) with BLER data less than 40%.
Figure 34:
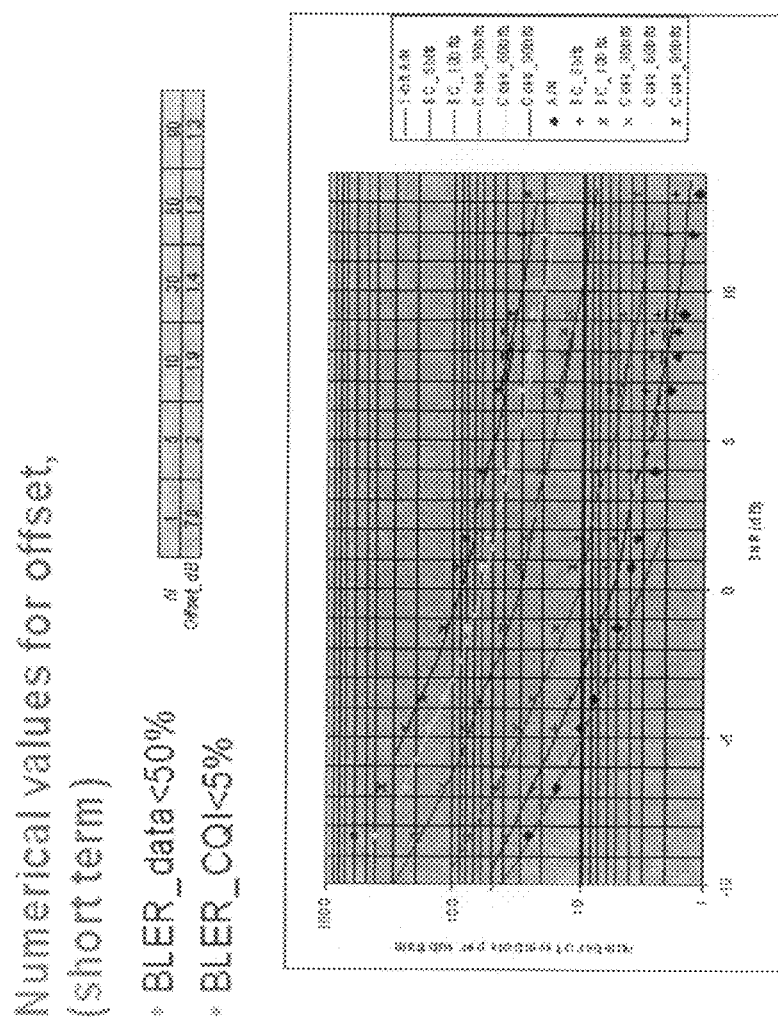
FIG. 34 shows numerical values for offset (short term) with BLER data less than 50%.
Figure 35:
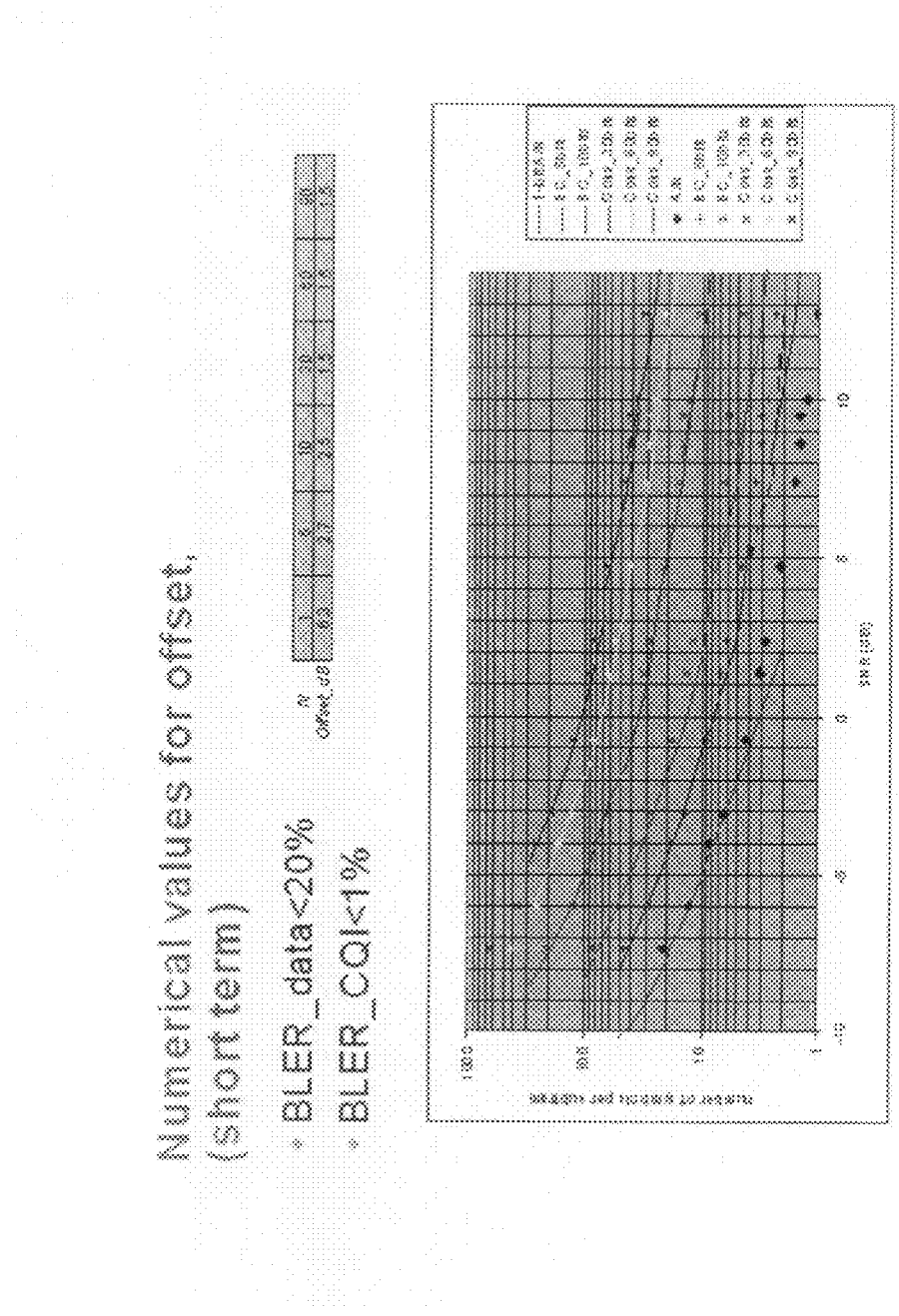
FIG. 35 shows numerical values for offset (short term) with BLER data less than 20%.
Figure 37:
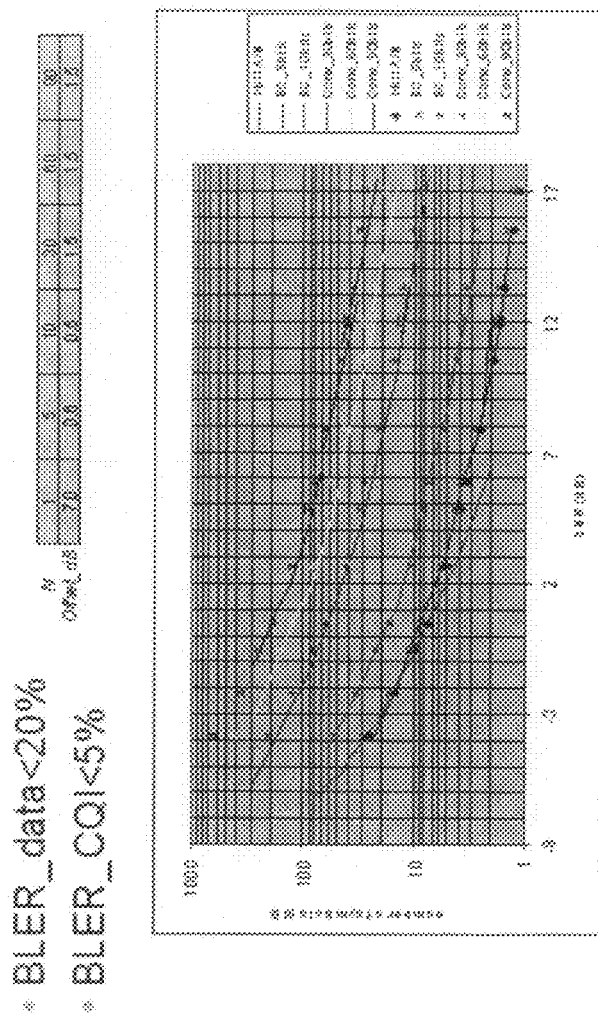
FIG. 37 shows numerical values for offset, 2 RBs (long term).

Another embodiment of the invention is one where DTX and ACK/NACK have non-overlapping symbol space. ACK/NACK can then utilize different symbol space than DTX, as shown in FIG. 4C. DTX/NACK can utilize the same symbol space, while ACK utilizes different symbol space, as shown in FIG. 4D.

If DTX and ACK/NACK have non-overlapping symbol space, DTX can be signaled simultaneously with A/N. Alternatively, DTX is not signaled in the case when A/N is transmitted.

The present invention provides a robust scheme to size the control channel for PUSCH. The method is applicable for both non-persistent and persistent cases. The method is applicable for all kind of control signals (ACK/NACK and CQI). The scheme works in different operation points and in different PUSCH bandwidths. The signaling need is minimized, and DTX detection is improved with reduced overhead.

The invention includes a variety of concepts, some of which can be briefly described as follows. It is to be understood that the following concepts can be further combined with each other in any multiple dependent manner, without departing from the scope of the invention.

An embodiment of the present invention includes a first concept which is a method comprising: providing a plurality of substantially static input parameters; providing a plurality of signalled input parameters; and determining from said substantially static input parameters and said plurality of signalled input parameters an output parameter indicative of a number of control symbols per transmission time interval for an amount of control signalling bits, wherein said output parameter relates to a modulation and coding scheme for an uplink.

An embodiment of the present invention includes a second concept, which is the first concept wherein said determining of the output parameter employs a ceil operation on a quantity that includes a product of a number of control signalling bits multiplied by a coding rate divided by a number of uncoded bits per symbol.

An embodiment of the present invention includes a third concept, which is the second concept wherein said number of control signalling bits is one of said signalled input parameters.

An embodiment of the present invention includes a fourth concept which is an apparatus comprising: means for providing a plurality of substantially static input parameters; means for providing a plurality of signalled input parameters; and means for determining from said substantially static input parameters and said plurality of signalled input parameters an output parameter indicative of a number of control symbols per transmission time interval for an amount of control signalling bits, wherein said output parameter relates to a modulation and coding scheme for an uplink.

An embodiment of the present invention includes a fifth concept, which is the fourth concept wherein said means for determining of the output parameter employs a ceil operation on a quantity that includes a product of a number of control signalling bits multiplied by a coding rate divided by a number of uncoded bits per symbol.

An embodiment of the present invention includes a sixth concept, which is the fifth concept wherein said number of control signalling bits is one of said signalled input parameters.

An embodiment of the present invention includes a seventh concept which is an apparatus comprising: an uplinking module configured to provide a plurality of substantially static input parameters; a layer configured to provide a plurality of signalled input parameters; and a processor configured to determine from said substantially static input parameters and said plurality of signalled input parameters an output parameter indicative of a number of control symbols per transmission time interval for an amount of control signalling bits, wherein said output parameter relates to a modulation and coding scheme for an uplink.

An embodiment of the present invention includes an eighth concept, which is the seventh concept wherein said processor employs a ceil operation on a quantity that includes a product of a number of control signalling bits multiplied by a coding rate divided by a number of uncoded bits per symbol.

An embodiment of the present invention includes a ninth concept, which is the eighth concept wherein said number of control signalling bits is one of said signalled input parameters.

An embodiment of the present invention includes a tenth concept which is a computer program product comprising a computer readable medium having executable code stored therein; the code, when executed by a processor, adapted to carryout: providing a plurality of substantially static input parameters; providing a plurality of signalled input parameters; and determining from said substantially static input parameters and said plurality of signalled input parameters an output parameter indicative of a number of control symbols per transmission time interval for an amount of control signalling bits, wherein said output parameter relates to a modulation and coding scheme for an uplink.

An embodiment of the present invention includes a eleventh concept, which is the tenth concept wherein said determining of the output parameter employs a ceil operation on a quantity that includes a product of a number of control signalling bits multiplied by a coding rate divided by a number of uncoded bits per symbol.

An embodiment of the present invention includes a twelfth concept, which is the eleventh concept wherein said number of control signalling bits is one of said signalled input parameters.

Additional embodiments of the present invention include one wherein CR is iteratively calculated, based on the actual coding rate, including the impact of control signals and possible sounding reference signal (i.e. not based on CR of MCS). Still a further embodiment is one wherein CR is based on the nominal coding rate, not including the impact of control signals and possible sounding reference signal. Yet another embodiment is one wherein ACK/NACK and CQI have different dynamic range for offset_dB parameter. And, the present invention also encompasses an embodiment wherein the relation of signalling and the following term is tabulated in a predetermined way (i.e. not signalling the offset_dB directly):

$$10^{\frac{-\text{offset\_dB}}{10}}$$

Regarding linkage between PUSCH MCS and amount of resources for control on PUSCH, in RAN1 #50 held in Athens many assumptions related to control signaling on PUSCH were agreed, as described in TSG-RAN WG1 #50, R1-073842 (described and incorporated by reference above):

Data and the different control fields (ACK/NAK, CQI/PMI) are mapped to separate modulation symbols Different coding rates for control is achieved by occupying different number of symbols The coding rate to use for the control signaling is given by the PUSCH MCS. The relation is expressed in a table.

In RAN1 #52bis (described and incorporated by reference above), some further details were agreed upon:

CQI/PMI on PUSCH uses the same modulation scheme as data on PUSCH

Semi-statically configured offset between the data MCS and the code rate of the control signaling (A/N and CQI)

Here, a formula is proposed to determine the size of control region based on data MCS. Also presented here is a numerical value set for the offset parameter. These values can be used to design the higher layer signaling needed to configure the offset parameter.

The proposed formula contains the following semi-static input parameters signalled via higher layers:

offset_dB performance difference between the given control channel and PUSCH data channel (in dB)

N: number of control signaling bits (for the given control signaling type)

The UL data MCS-related input parameters known in advance are:

CR: Coding rate of given PUSCH MCS (e.g., 3/1)

$M_{Mod}$: Number of (uncoded) bits/symbol of PUSCH MCS, [2, 4 or 6] with QPSK, 16 QAM, 64 QAM.

$M_{ctrl}$ is the number of control symbols/TTI and it is calculated as follows:

$$M_{ctrl} = \left\lceil \frac{N \cdot \frac{CR}{M_{Mod}}}{10^{\frac{-\text{offset\_dB}}{10}}} \right\rceil,$$

where $\lceil \cdot \rceil$ rounds the control channel size to the nearest supported integer value, towards (plus) infinity. The supported integers are based on the coding/repetition/puncturing assumptions made for given control signaling on PUSCH. It is also noted that due to implementation reasons it may be better to tabulate the relation of offset_dB signaling and term $$10^{\frac{-offset\_dB}{10}},$$

instead of signaling the offset_dB directly.

The offset parameter depends on the BLER operation point of PUSCH data and CQI. It is assumed here that offset_dB parameter is signaled via RRC signaling. Notice the following:

- a common offset_dB parameter for all the PUSCH MCSs is sufficient
- a common offset_dB parameter for different bandwidth options is sufficient. Persistent scheduling requiring bandwidth dependent offset_dB-parameter is a special case since the adaptive transmission bandwidth is not used with the persistent scheduling.

Table 1 shows simulated/optimized values for the offset_dB parameter. We note that different offset_dB parameter is needed for ACK/NACK and different CQI sizes. Numerical values presented in Table 1 can be used to estimate the number of bits needed to configure the offset_dB-parameter. Based on these results, in order to minimize the control overhead, we propose that offset_dB parameter related to A/N signaling is configured using 3 bits (around 6.5 dB)
offset_dB parameter related to CQI signaling is configured using 4-5 bits (around 1.5 dB)

Periodic CQI and scheduled CQI may require their own offset_dB-parameter.

When signaling ACK/NACK on PUSCH, an important issue that needs to be taken into account is the DTX-to-ACK problem. Results in Table 1 assume that UE has the knowledge about the presence of ACK/NACK on PUSCH. However, if no information about the presence of ACK/NACK is available, then the number of ACK/NACK symbols needed must be heavily over dimensioned. It is also noted that different formula may be need for ACK/NACK and CQI in the case when UE has no knowledge about the presence of ACK/NACK on PUSCH.

TABLE 1

Numerical values for offset_dB -parameter, non-persistent scheduling, 2RBs, TU channel, v = 3 km/h Offset (dB)

| QoS | | | N | | | | | |
|---|---|---|---|---|---|---|---|---|
| Data BLER | CQI BLER | A/N BER | 1 | 5 | 10 | 30 | 60 | 90 |
| 50% | 5% | 0.1% | 7.0 | 2.0 | 1.9 | 1.4 | 1.3 | 1.3 |
| 40% | 1% | 0.1% | 6.8 | 2.5 | 3.1 | 2.2 | 2.2 | 2.2 |
| 40% | 5% | 0.1% | 6.8 | 1.8 | 1.6 | 1.2 | 1.2 | 1.2 |
| 30% | 10% | 0.1% | 6.8 | 1.1 | 1.1 | 0.8 | 0.8 | 0.8 |
| 20% | 5% | 0.1% | 6.5 | 1.5 | 1.5 | 1.0 | 1.0 | 1.0 |
| 20% | 1% | 0.1% | 6.3 | 2.7 | 2.5 | 1.5 | 1.5 | 1.5 |
| 20% | 5% | 0.1% | 6.3 | 1.2 | 1.2 | 0.8 | 0.8 | 0.8 |
| 20% | 10% | 0.1% | 6.3 | 0.5 | 0.5 | 0.4 | 0.4 | 0.4 |
| 10% | 1% | 10.0% | 5.8 | 2.4 | 2.2 | 1.3 | 1.3 | 1.3 |

Among other things, this embodiment of the present invention provides a detailed formula to determine the size of control region based on data MCS. It is also proposed that this formula be used as a method to size the control channel on PUSCH. The proposed formula minimizes the signaling burden and keeps the control channel quality at the target level. Furthermore, it can be applied for both persistently and dynamically scheduled data and for all kind of control types such as ACK/NACK and CQI.

TABLE 2

Numerical non-quantized values for $M_{ctrl}$ parameter, N = 30, offset_dB varies between 0 dB and 3 dB

| Data MCS | CR | Mmod | N 30 offset_dB | | | | | | |
|---|---|---|---|---|---|---|---|---|---|
| | | | 0.00 Mctrl | 0.50 | 1.00 | 1.50 | 2.00 | 2.50 | 3.00 |
| QPSK 1/10 | 10.0 | 2 | 150.0 | 168.3 | 188.8 | 211.9 | 237.7 | 266.7 | 299.3 |
| QPSK 1/6 | 6.0 | 2 | 90.0 | 101.0 | 113.3 | 127.1 | 142.6 | 160.0 | 179.6 |
| QPSK 1/4 | 4.0 | 2 | 60.0 | 67.3 | 75.5 | 84.8 | 95.1 | 106.7 | 119.7 |
| QPSK 1/3 | 3.0 | 2 | 45.0 | 50.5 | 56.7 | 63.6 | 71.3 | 80.0 | 89.8 |
| QPSK 1/2 | 2.0 | 2 | 30.0 | 33.7 | 37.8 | 42.4 | 47.5 | 53.3 | 59.9 |
| QPSK 2/3 | 1.5 | 2 | 22.5 | 25.2 | 28.3 | 31.8 | 35.7 | 40.0 | 44.9 |
| QPSK 3/4 | 1.3 | 2 | 20.0 | 22.4 | 25.2 | 28.3 | 31.7 | 35.6 | 39.9 |
| 16QAM 1/2 | 2.0 | 4 | 15.0 | 16.8 | 18.9 | 21.2 | 23.8 | 26.7 | 29.9 |
| 16QAM 2/3 | 1.5 | 4 | 11.3 | 12.6 | 14.2 | 15.9 | 17.8 | 20.0 | 22.4 |
| 16QAM 3/4 | 1.3 | 4 | 10.0 | 11.2 | 12.6 | 14.1 | 15.8 | 17.8 | 20.0 |
| 16QAM 5/6 | 1.2 | 4 | 9.0 | 10.1 | 11.3 | 12.7 | 14.3 | 16.0 | 18.0 |
| 64QAM 1/2 | 2.0 | 6 | 10.0 | 11.2 | 12.6 | 14.1 | 15.8 | 17.8 | 20.0 |
| 64QAM 2/3 | 1.5 | 6 | 7.5 | 8.4 | 9.4 | 10.6 | 11.9 | 13.3 | 15.0 |
| 64QAM 3/4 | 1.3 | 6 | 6.7 | 7.5 | 8.4 | 9.4 | 10.6 | 11.9 | 13.3 |
| 64QAM 5/6 | 1.2 | 6 | 6.0 | 6.7 | 7.6 | 8.5 | 9.5 | 10.7 | 12.0 |

Each of the embodiments described above can be implemented using a general purpose or specific-use computer system, with standard operating system software conforming to the method described herein. The software is designed to drive the operation of the particular hardware of the system, and will be compatible with other system components and I/O controllers. The computer system of this embodiment includes a CPU processor, comprising a single processing unit, multiple processing units capable of parallel operation, or the CPU can be distributed across one or more processing units in one or more locations, e.g., on a client and server. A memory may comprise any known type of data storage and/or transmission media, including magnetic media, optical media, random access memory (RAM), read-only memory (ROM), a data cache, a data object, etc. Moreover, similar to the CPU, the memory may reside at a single physical location, comprising one or more types of data storage, or be distributed across a plurality of physical systems in various forms.

It is to be understood that the present figures, and the accompanying narrative discussions of best mode embodiments, do not purport to be completely rigorous treatments of the method, system, mobile device, network element, and software product under consideration. A person skilled in the art will understand that the steps and signals of the present application represent general cause-and-effect relationships that do not exclude intermediate interactions of various types, and will further understand that the various steps and structures described in this application can be implemented by a variety of different sequences and configurations, using various different combinations of hardware and software which need not be further detailed herein.

What is claimed is:

1. A method, comprising:
   providing at an enhanced NodeB a plurality of static input parameters;
   providing at the enhanced NodeB a plurality of signaled input parameters, wherein one of said plurality of signalled input parameters comprises an offset describing a quality difference between a control channel and a data channel; and
   determining at the enhanced NodeB from said plurality of static input parameters and said plurality of signalled input parameters an output parameter indicative of a number of control symbols per transmission time interval for an amount of control signaling bits,
   wherein said output parameter relates to a physical resource with given modulation and coding scheme for an uplink communication.

2. The method of claim 1, wherein said determining of the output parameter employs a ceil operation on a quantity that includes a product of a number of control signalling bits multiplied by a coding rate divided by a number of uncoded bits per symbol.

3. The method of claim 2, wherein said number of control signaling bits is one of said signalled input parameters.

4. The method of claim 2, wherein said data channel is a physical uplink data channel.

5. The method of claim 4, wherein said quality difference comprises at least one offset parameter.

6. The method of claim 1, wherein a coding rate divided by a number of uncoded bits per symbol is obtained from a resource allocation of uplink data channel.

7. The method of claim 1, wherein a first offset parameter is used for acknowledgement and a second offset parameter is used for channel quality indicator.

8. The method of claim 1, wherein an uplink data channel is punctured according to said number of control symbols.

9. A user equipment, comprising:
   a processor; and
   memory including computer program code, the memory and the computer program code configured to, with the processor, cause the user equipment at least to:
   provide a plurality of static input parameters;
   provide a plurality of signalled input parameters, wherein one of said plurality of signalled input parameters comprises an offset describing a quality difference between a control channel and a data channel; and
   determine from said plurality of static input parameters and said plurality of signalled input parameters an output parameter indicative of a number of control symbols per transmission time interval for an amount of control signalling bits,
   wherein said output parameter relates to a modulation and coding scheme for an uplink communication.

10. The user equipment of claim 9, wherein determining of the output parameter employs a ceil operation on a quantity that includes a product of a number of control signalling bits multiplied by a coding rate divided by a number of uncoded bits per symbol.

11. The user equipment of claim 10, wherein said number of control signalling bits is one of said signalled input parameters.

12. The user equipment of claim 10, wherein said data channel is a physical uplink data channel.

13. The user equipment of claim 12, wherein said quality difference comprises at least one offset parameter.

14. An enhanced NodeB, comprising:
    a processor;
    memory including computer program code, the memory and the computer program code configured to, with the processor, cause the enhanced NodeB at least to:
    provide a plurality of static input parameters;
    provide a plurality of signalled input parameters, wherein one of said plurality of signalled input parameters comprises an offset describing a quality difference between a control channel and a data channel; and
    determine from said plurality of static input parameters and said plurality of signalled input parameters an output parameter indicative of a number of control symbols per transmission time interval for an amount of control signalling bits,
    wherein said output parameter relates to a modulation and coding scheme for an uplink communication.

15. The enhanced NodeB of claim 14, wherein said processor employs a ceil operation on a quantity that includes a product of a number of control signalling bits multiplied by a coding rate divided by a number of uncoded bits per symbol.

16. The enhanced NodeB of claim 15, wherein said number of control signalling bits is one of said signalled input parameters.

17. The enhanced NodeB of claim 15, wherein said data channel is a physical uplink data channel.

18. The enhanced NodeB of claim 17, wherein said quality difference comprises at least one offset parameter.

19. A computer program product comprising a non-transitory computer readable medium having executable code stored therein; the code, when executed by a processor, adapted to carry out:
    providing a plurality of static input parameters;
    providing a plurality of signalled input parameters, wherein one of said plurality of signalled input parameters comprises an offset describing a quality difference between a control channel and a data channel; and
    determining from said plurality of static input parameters and said plurality of signalled input parameters an output parameter indicative of a number of control symbols per transmission time interval for an amount of control signalling bits,
    wherein said output parameter relates to a modulation and coding scheme for an uplink communication.

20. The computer program product of claim 19, wherein said determining of the output parameter employs a ceil operation on a quantity that includes a product of a number of control signalling bits multiplied by a coding rate divided by a number of uncoded bits per symbol.

21. The computer program product of claim 20, wherein said number of control signalling bits is one of said signalled input parameters.

22. The computer program product of claim 20, wherein said data channel is a physical uplink data channel.

23. The computer program product of claim 20, wherein said quality difference comprises at least one offset parameter.

24. A method, comprising:
- providing at a user equipment a plurality of static input parameters;
- providing at the user equipment a plurality of signaled input parameters, wherein one of said plurality of signaled input parameters comprises an offset describing a quality difference between a control channel and a data channel; and
- determining at the user equipment from said plurality of static input parameters and said plurality of signaled input parameters an output parameter indicative of a number of control symbols per transmission time interval for an amount of control signaling bits,
- wherein said output parameter relates to a physical resource with given modulation and coding scheme for an uplink communication.

\* \* \* \* \*